US010002405B2

(12) United States Patent
Barstow et al.

(10) Patent No.: US 10,002,405 B2
(45) Date of Patent: Jun. 19, 2018

(54) SMART OPTIMIZATION OF UNUSED GRAPHICS BUFFER MEMORY IN COMPUTING ENVIRONMENTS

(71) Applicant: INTEL CORPORATION, Santa Clara, CA (US)

(72) Inventors: Jason Barstow, Yate (GB); Gary Smith, Bristol (GB)

(73) Assignee: Intel Corporation, Santa Clara, CA (US)

( * ) Notice: Subject to any disclaimer, the term of this patent is extended or adjusted under 35 U.S.C. 154(b) by 79 days.

(21) Appl. No.: 15/080,358

(22) Filed: Mar. 24, 2016

(65) Prior Publication Data

US 2017/0213314 A1 Jul. 27, 2017

Related U.S. Application Data

(60) Provisional application No. 62/286,180, filed on Jan. 22, 2016.

(51) Int. Cl.
*G06F 3/06* (2006.01)
*G06T 1/60* (2006.01)
*G06T 1/20* (2006.01)

(52) U.S. Cl.
CPC .............. *G06T 1/60* (2013.01); *G06F 3/0604* (2013.01); *G06F 3/0631* (2013.01); *G06F 3/0656* (2013.01); *G06F 3/0673* (2013.01); *G06T 1/20* (2013.01)

(58) Field of Classification Search
CPC . G06T 1/60; G06T 1/20; G06F 3/0673; G06F 3/0631; G06F 3/0656; G06F 3/0604
See application file for complete search history.

(56) References Cited

U.S. PATENT DOCUMENTS

2014/0310552 A1* 10/2014 So .................... G06F 1/3275
713/324

* cited by examiner

*Primary Examiner* — Reginald G Bragdon
*Assistant Examiner* — Edward Wang
(74) *Attorney, Agent, or Firm* — Jaffery Watson Mendonsa & Hamilton LLC

(57) ABSTRACT

A mechanism is described for facilitating smart optimization of unused graphics buffer memory in computing environments. A method of embodiments, as described herein, includes detecting a software application at a computing device, where the software application to place a request for a task capable of being executed by a processor of the computing device. The method may further include allocating a composition of buffers and facilitate allocation of physical memory to the buffers to be used to perform the task, where a first portion of the physical memory and a second portion of the physical memory are allocated to first one or more of the buffers and second one or more of the buffers, respectively. The method may further include purging first one or more of the buffers, if the first one or more of the buffers are determined to be unused for the task, where purging includes disallowing commitment of the first portion of the physical memory to the first one or more of the buffers such that the first portion of the physical memory remains available for other tasks despite being allocated to the first one or more of the buffers.

24 Claims, 17 Drawing Sheets

FIG. 9A   GRAPHICS PROCESSOR COMMAND FORMAT
900
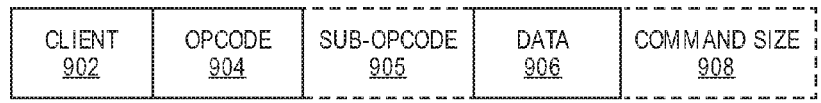
FIG. 9B   GRAPHICS PROCESSOR COMMAND SEQUENCE
910
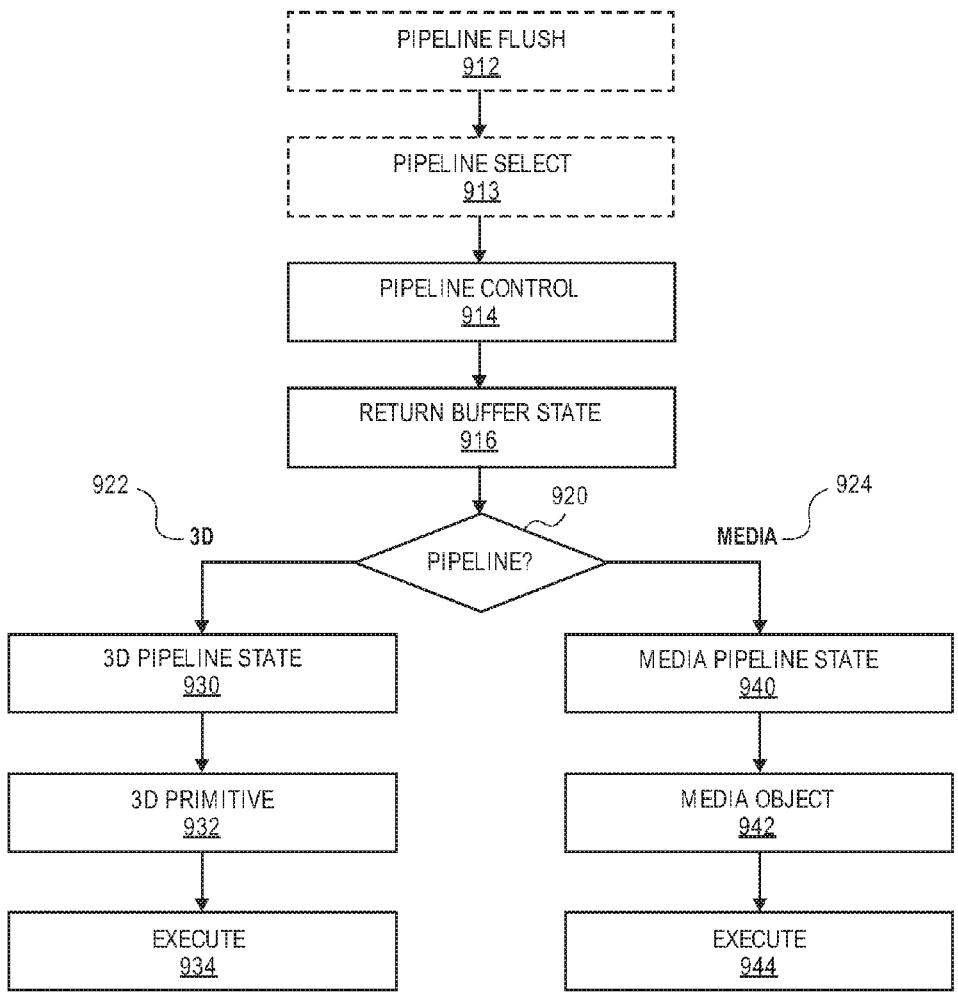

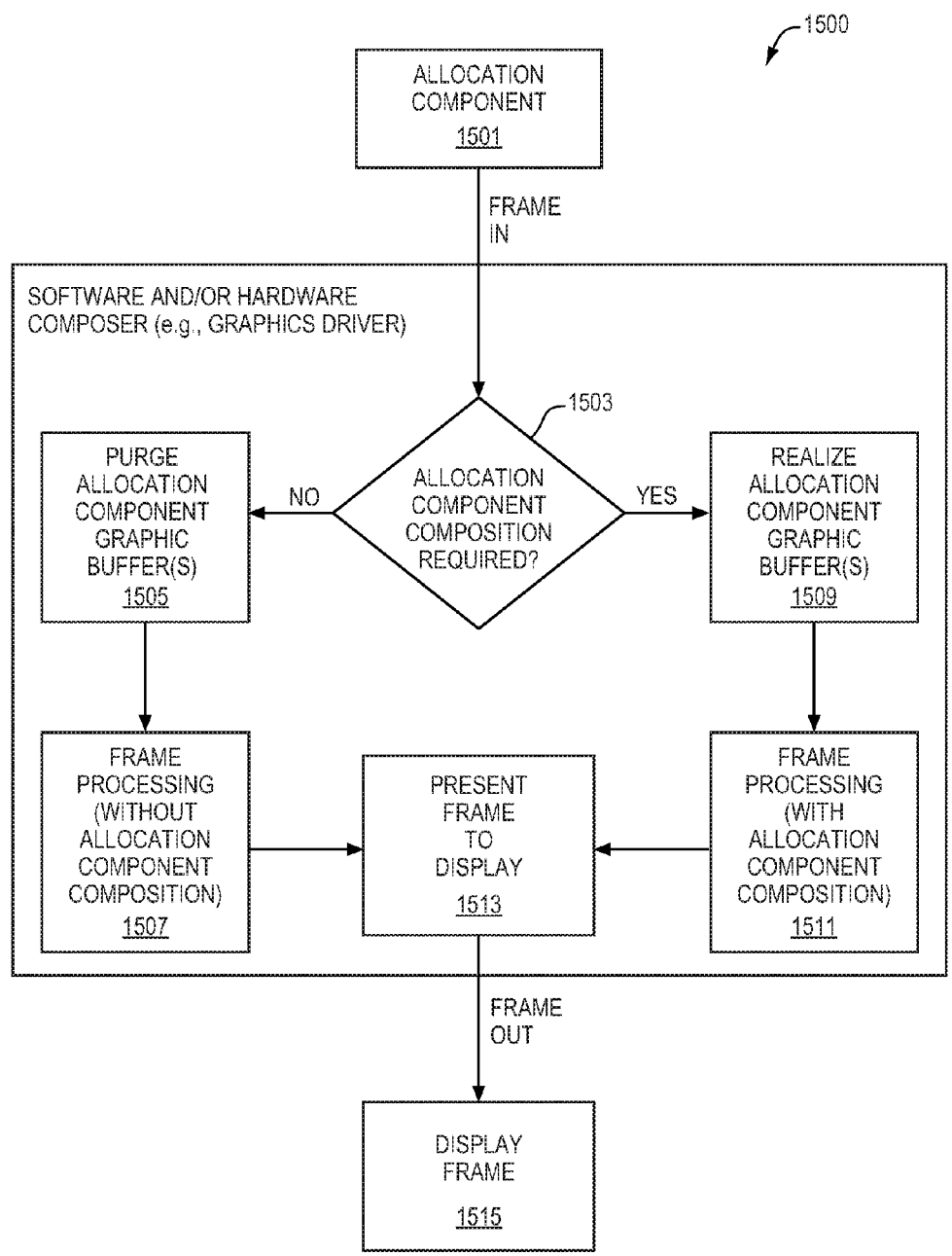

SMART OPTIMIZATION OF UNUSED GRAPHICS BUFFER MEMORY IN COMPUTING ENVIRONMENTS

CLAIM OF PRIORITY

This application claims priority to U.S. Provisional Patent Application No. 62/286,180, entitled OPTIMIZATION OF UNUSED GRAPHICS BUFFER MEMORY, by Jason Barstow, et al., filed Jan. 22, 2016, the benefit of and priority to which are claimed thereof and the entire contents of which are incorporated herein by reference.

FIELD

Embodiments described herein generally relate to computers. More particularly, embodiments are described for facilitating smart optimization of unused graphics buffer memory in computing environments.

BACKGROUND

Graphics memory footprint is common for a running computing system where memory buffers allocated by a component are often not used without the knowledge or intervention of the component originally allocating the buffers. Conventional techniques often result in a waste of memory resources associated with graphics buffers, such as when a particular processing state lasts for a long period of time.

BRIEF DESCRIPTION OF THE DRAWINGS

Embodiments are illustrated by way of example, and not by way of limitation, in the figures of the accompanying drawings in which like reference numerals refer to similar elements.

FIG. 9A is a block diagram illustrating a graphics processor command format according to an embodiment and FIG. 9B is a block diagram illustrating a graphics processor command sequence according to an embodiment.

FIG. 15 illustrates a method for facilitating buffer optimization at computing devices according to one embodiment.

DETAILED DESCRIPTION

Figure 1:
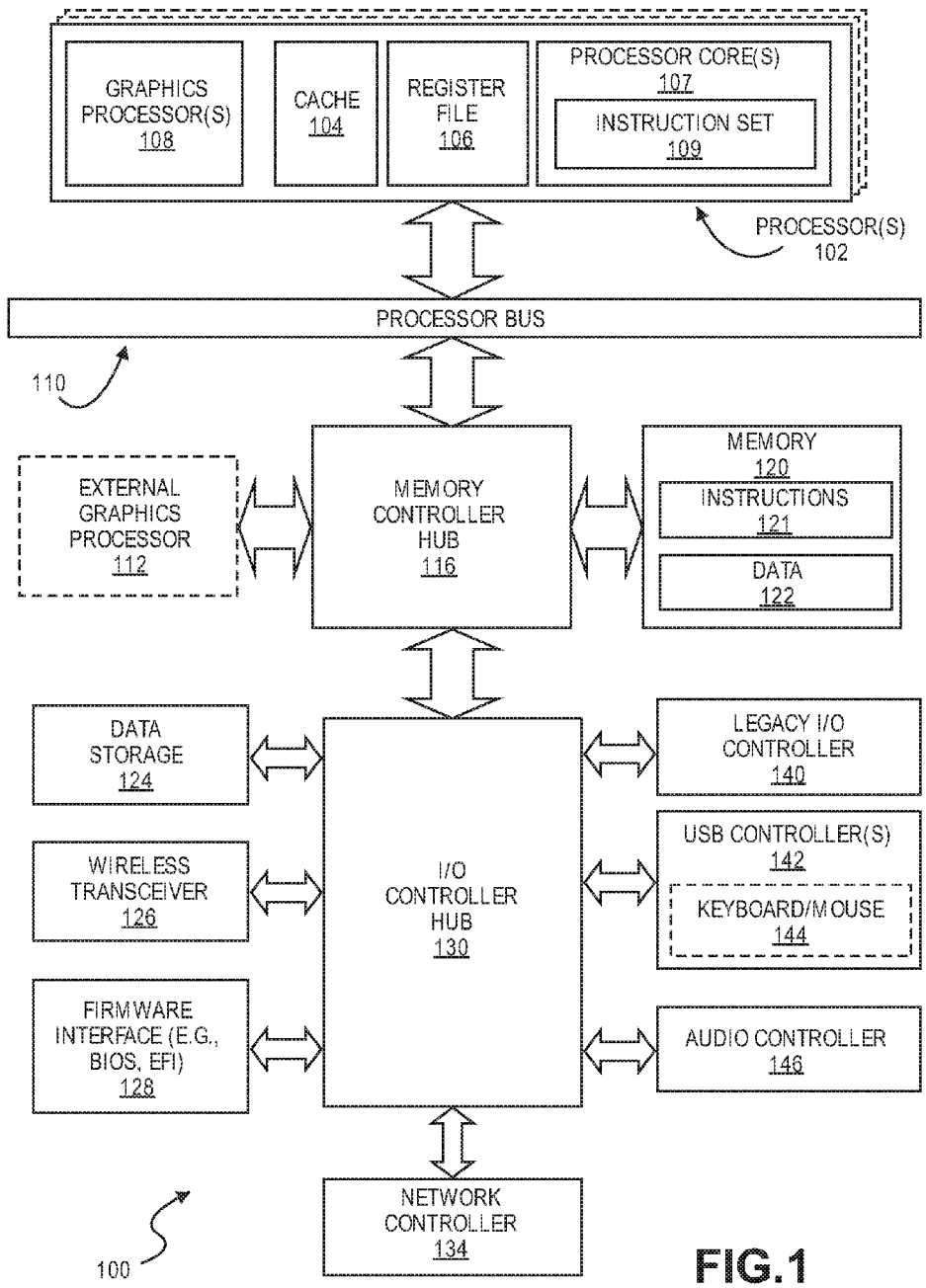
FIG. 1 is a block diagram of a processing system, according to an embodiment.

In the following description, numerous specific details are set forth. However, embodiments, as described herein, may be practiced without these specific details. In other instances, well-known circuits, structures and techniques have not been shown in details in order not to obscure the understanding of this description.

Embodiments provide for a novel memory management technique for reducing graphics memory footprints relating to graphics buffers on a running computing system. For example, any memory associated with graphics buffers may be entirely released or partially reduced without the intervention or knowledge of their allocation components.

For example, embodiments provide for identifying any graphics buffers and their corresponding components that are responsible for allocating the buffers and determine whether the buffers are to be used by the allocation components. In one embodiment, upon obtaining the results, one or more of the buffers may be either realized or purged based on whether the one or more buffers are to be used or not used by the allocation components.

In one embodiment, realizing of buffers may be used as opposite to purging of buffers, such as an upstream allocation object component may allocate the buffer which may remain allocated at all times, where, in one embodiment, depending on current use requirements in relating to a task requested by a software application at a computing device, one or more of the buffers may be realized or purged. It is to be noted that the term "realize" may be used synonymously with other similar terms like "commit", "allow", "achieve", "accomplish", "make", etc., and similarly, the term "purge" may be used synonymously with other similar terms like "uncommit", "disallow", "remove", "clear", "rid", "make free", etc.

For example, realizing one or more buffers may include committing or allowing commitment of a portion of physical memory to the one or more buffers in accordance with allocation or association of the portion of physical memory to the one or more buffers. This committed portion of the physical memory may then be used by one or more components (e.g., graphics driver, etc.) of the computing device to perform one or more operations relating to the task requested by the software application at the computing device.

Similarly, for example, purging one or more buffers may include uncommitting or disallowing commitment of a portion of physical memory to one or more buffers despite the portion of physical memory being allocated to or associated with the one or more buffers. This uncommitted portion of physical memory may not be used for the task and thus remain available to be used for one or more other tasks requested by the software application or other software applications at the computing device.

It is contemplated that terms like "request", "query", "job", "work", "work item", and "workload" may be referenced interchangeably throughout this document. Similarly, an "application" or "agent" may refer to or include a computer program, a software application, a game, a workstation application, etc., offered through an application programming interface (API), such as a free rendering API, such as Open Graphics Library (OpenGL®), DirectX® 11, DirectX® 12, etc., where "dispatch" may be interchangeably referred to as "work unit" or "draw" and similarly, "application" may be interchangeably referred to as "workflow" or simply "agent". For example, a workload, such as that of a three-dimensional (3D) game, may include and issue any number and type of "frames" where each frame may represent an image (e.g., sailboat, human face). Further, each frame may include and offer any number and type of work units, where each work unit may represent a part (e.g., mast of sailboat, forehead of human face) of the image (e.g., sailboat, human face) represented by its corresponding frame. However, for the sake of consistency, each item may be referenced by a single term (e.g., "dispatch", "agent", etc.) throughout this document.

In some embodiments, terms like "display screen" and "display surface" may be used interchangeably referring to the visible portion of a display device while the rest of the display device may be embedded into a computing device, such as a smartphone, a wearable device, etc. It is contemplated and to be noted that embodiments are not limited to any particular computing device, software application, hardware component, display device, display screen or surface, protocol, standard, etc. For example, embodiments may be applied to and used with any number and type of real-time applications on any number and type of computers, such as desktops, laptops, tablet computers, smartphones, head-mounted displays and other wearable devices, and/or the like. Further, for example, rendering scenarios for efficient performance using this novel technique may range from simple scenarios, such as desktop compositing, to complex scenarios, such as 3D games, augmented reality applications, etc.

System Overview

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In on embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 2:
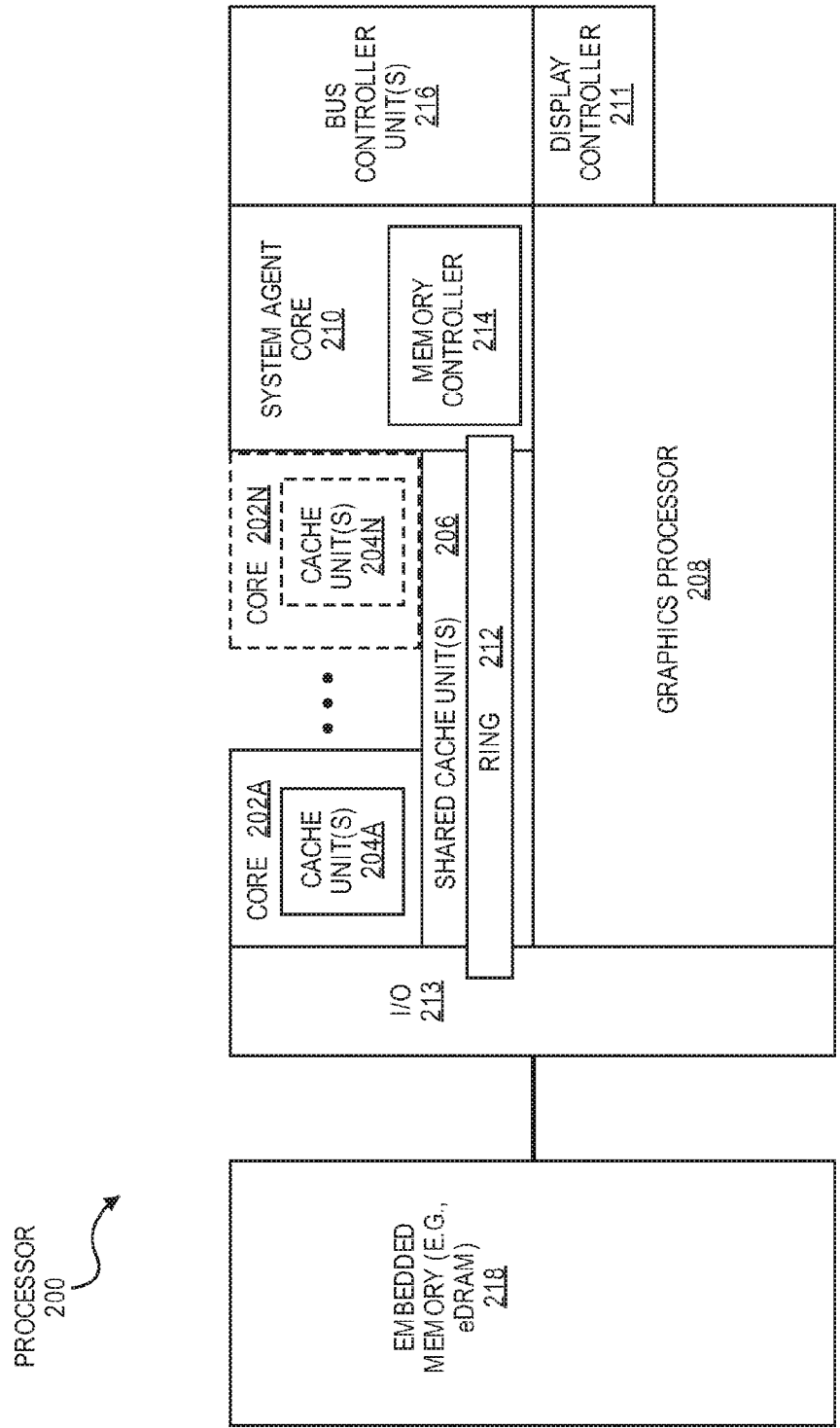
FIG. 2 is a block diagram of an embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
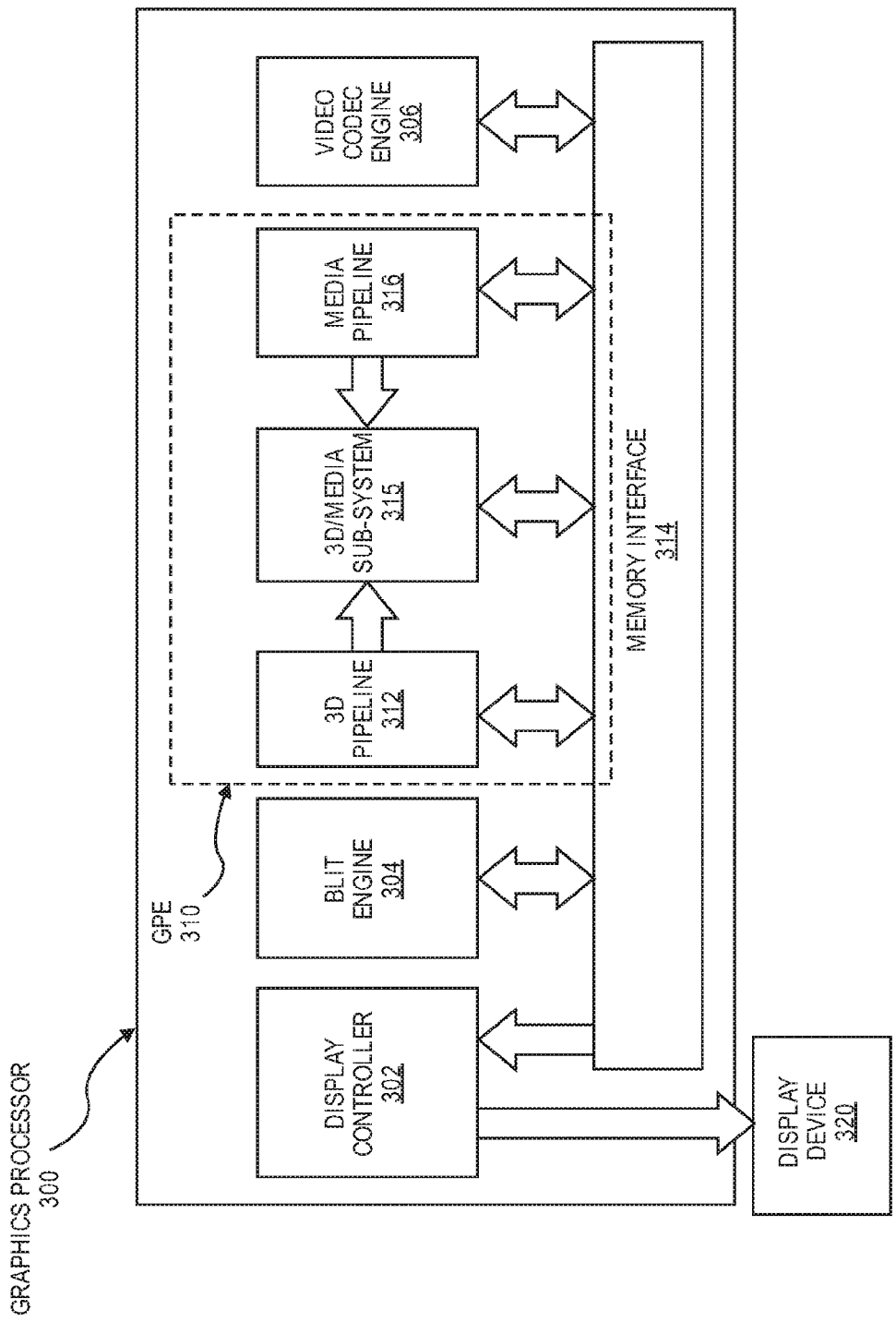
FIG. 3 is a block diagram of a graphics processor, which may be a discrete graphics processing unit, or may be a graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, graphics processing engine 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

3D/Media Processing

Figure 4:
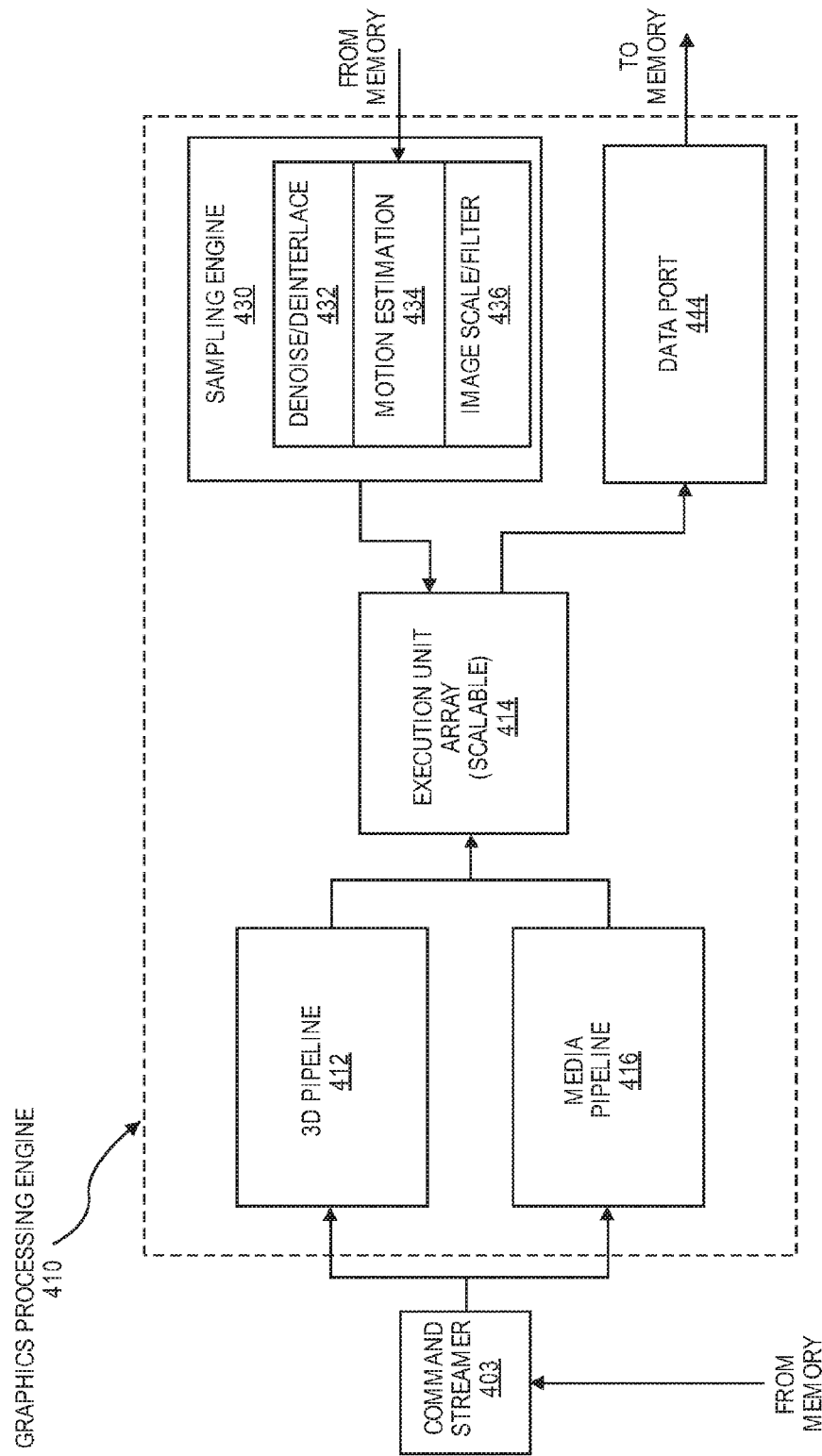
FIG. 4 is a block diagram of a graphics processing engine of a graphics processor in accordance with some embodiments.

FIG. 4 is a block diagram of a graphics processing engine 410 of a graphics processor in accordance with some embodiments. In one embodiment, the GPE 410 is a version of the GPE 310 shown in FIG. 3. Elements of FIG. 4 having the same reference numbers (or names) as the elements of any other figure herein can operate or function in any manner similar to that described elsewhere herein, but are not limited to such.

In some embodiments, GPE 410 couples with a command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The commands are directives fetched from a ring buffer, which stores commands for the 3D and media pipelines 412, 416. In one embodiment, the ring buffer can additionally include batch command buffers storing batches of multiple commands. The 3D and media pipelines 412, 416 process the commands by performing operations via logic within the respective pipelines or by dispatching one or more execution threads to an execution unit array 414. In some embodiments, execution unit array 414 is scalable, such that the array includes a variable number of execution units based on the target power and performance level of GPE 410.

In some embodiments, a sampling engine 430 couples with memory (e.g., cache memory or system memory) and execution unit array 414. In some embodiments, sampling engine 430 provides a memory access mechanism for execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes a de-noise/de-interlace module 432, a motion estimation module 434, and an image scaling and filtering module 436. In some embodiments, de-noise/de-interlace module 432 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 432 includes dedicated motion detection logic (e.g., within the motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 434 to perform operations on video at the macro-block level that may otherwise be too computationally intensive to perform with a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, the GPE 410 includes a data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GPE 410.

Execution Units

Figure 5:
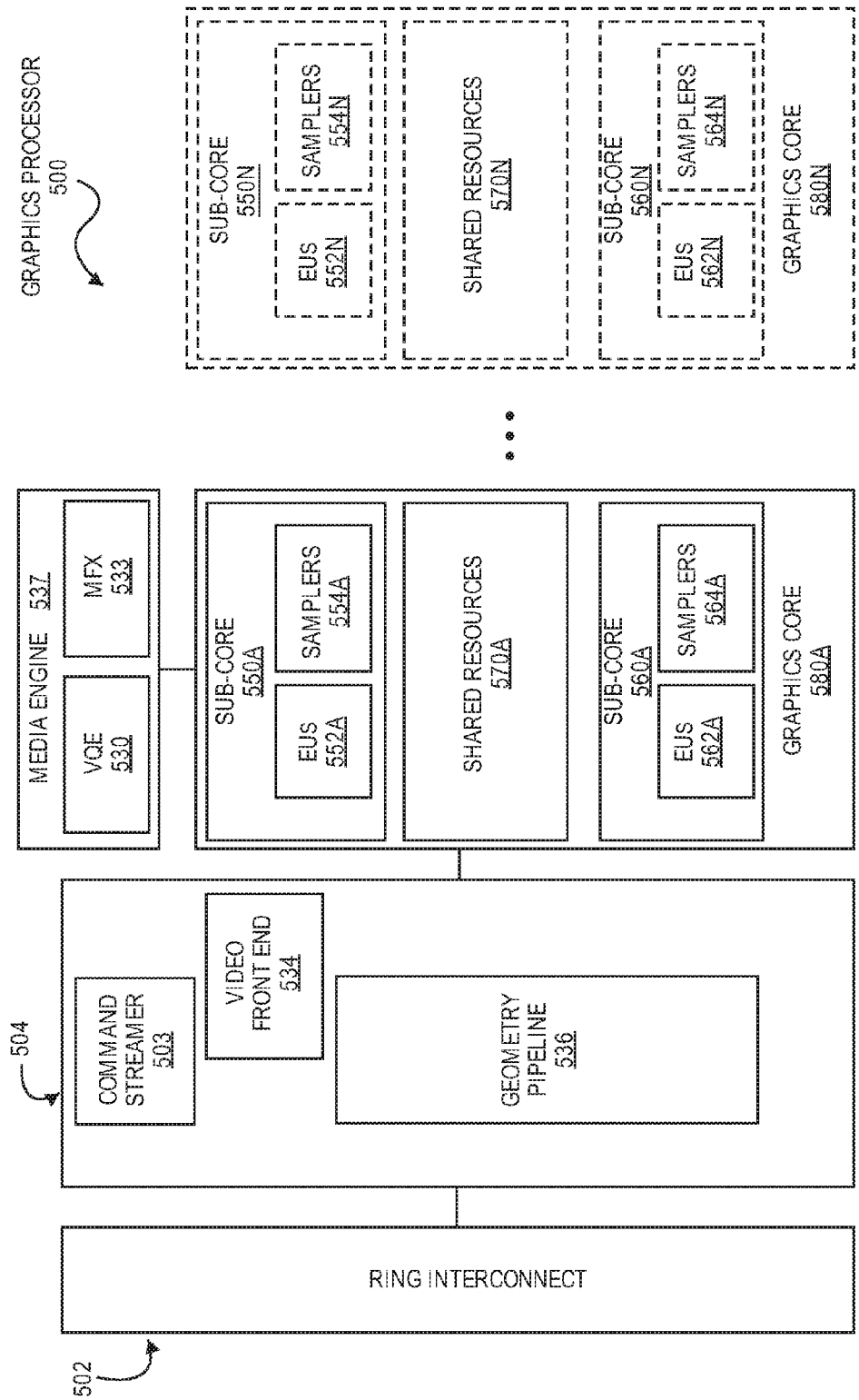
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Figure 6:
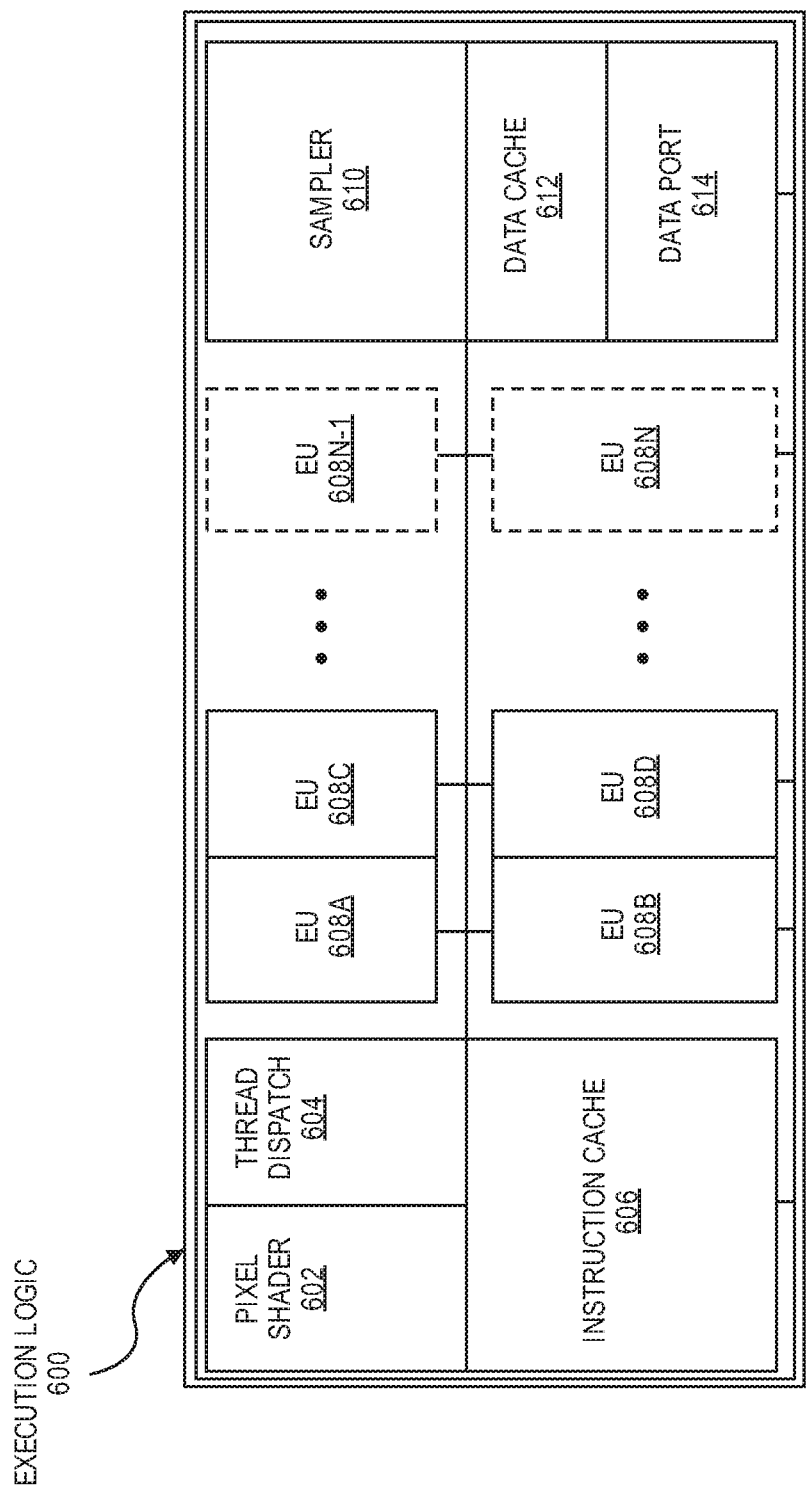
FIG. 6 illustrates thread execution logic including an array of processing elements employed in some embodiments of a graphics processing engine.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a pixel shader 602, a thread dispatcher 604, instruction cache 606, a scalable execution unit array including a plurality of execution units 608A-608N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-608N. In some embodiments, each execution unit (e.g. 608A) is an individual vector processor capable of executing multiple simultaneous threads and processing multiple data elements in parallel for each thread. In some embodiments, execution unit array 608A-608N includes any number individual execution units.

In some embodiments, execution unit array 608A-608N is primarily used to execute "shader" programs. In some embodiments, the execution units in array 608A-608N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes a local thread dispatcher 604 that arbitrates thread initiation requests from the graphics and media pipelines and instantiates the requested threads on one or more execution units 608A-608N. For example, the geometry pipeline (e.g., 536 of FIG. 5) dispatches vertex processing, tessellation, or geometry processing threads to thread execution logic 600 (FIG. 6). In some embodiments, thread dispatcher 604 can also process runtime thread spawning requests from the executing shader programs.

Once a group of geometric objects has been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an application programming interface (API)-supplied pixel shader program. To execute the pixel shader program, pixel shader 602 dispatches threads to an execution unit (e.g., 608A) via thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

Figure 7:
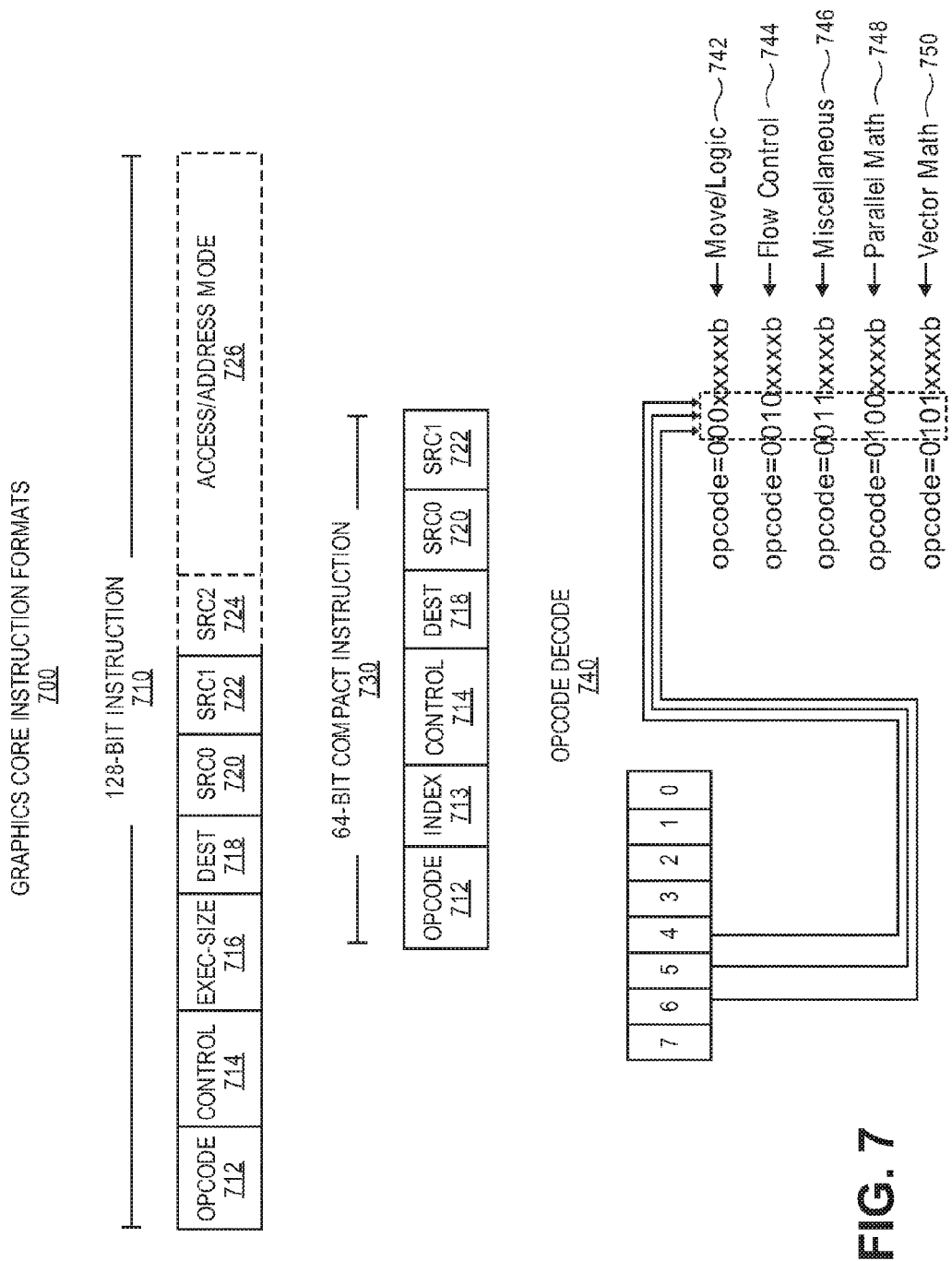
FIG. 7 is a block diagram illustrating a graphics processor instruction formats according to some embodiments.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 722, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode information 726 specifying, for example, whether direct register addressing mode or indirect register addressing mode is used. When direct register addressing mode is used, the register address of one or more operands is directly provided by bits in the instruction 710.

In some embodiments, the 128-bit instruction format 710 includes an access/address mode field 726, which specifies an address mode and/or an access mode for the instruction. In one embodiment the access mode to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction 710 may use byte-aligned addressing for source and destination operands and when in a second mode, the instruction 710 may use 16-byte-aligned addressing for all source and destination operands.

In one embodiment, the address mode portion of the access/address mode field 726 determines whether the instruction is to use direct or indirect addressing. When direct register addressing mode is used bits in the instruction 710 directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
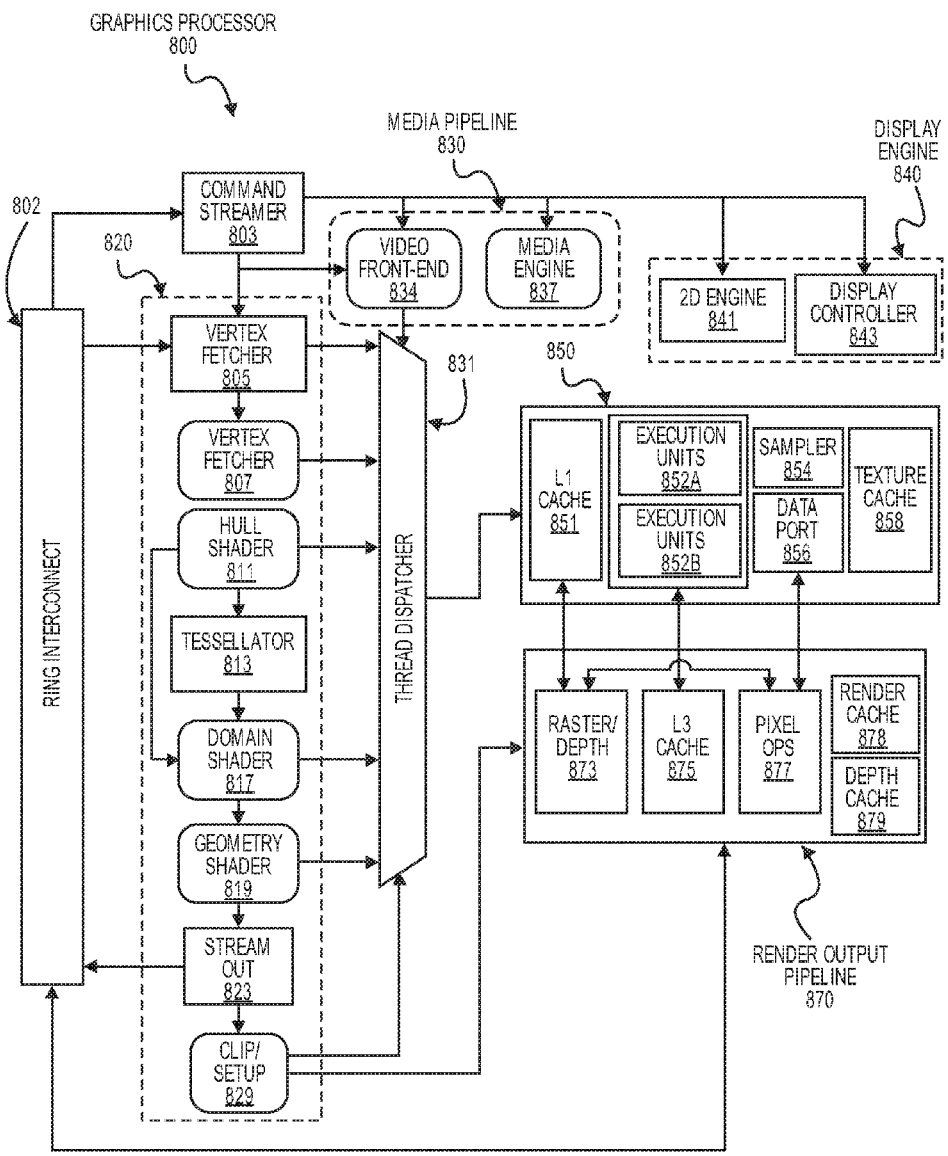
FIG. 8 is a block diagram of another embodiment of a graphics processor.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass the rasterizer 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 337 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command is 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of media pipeline state commands 940 are dispatched or placed into in a command queue before the media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
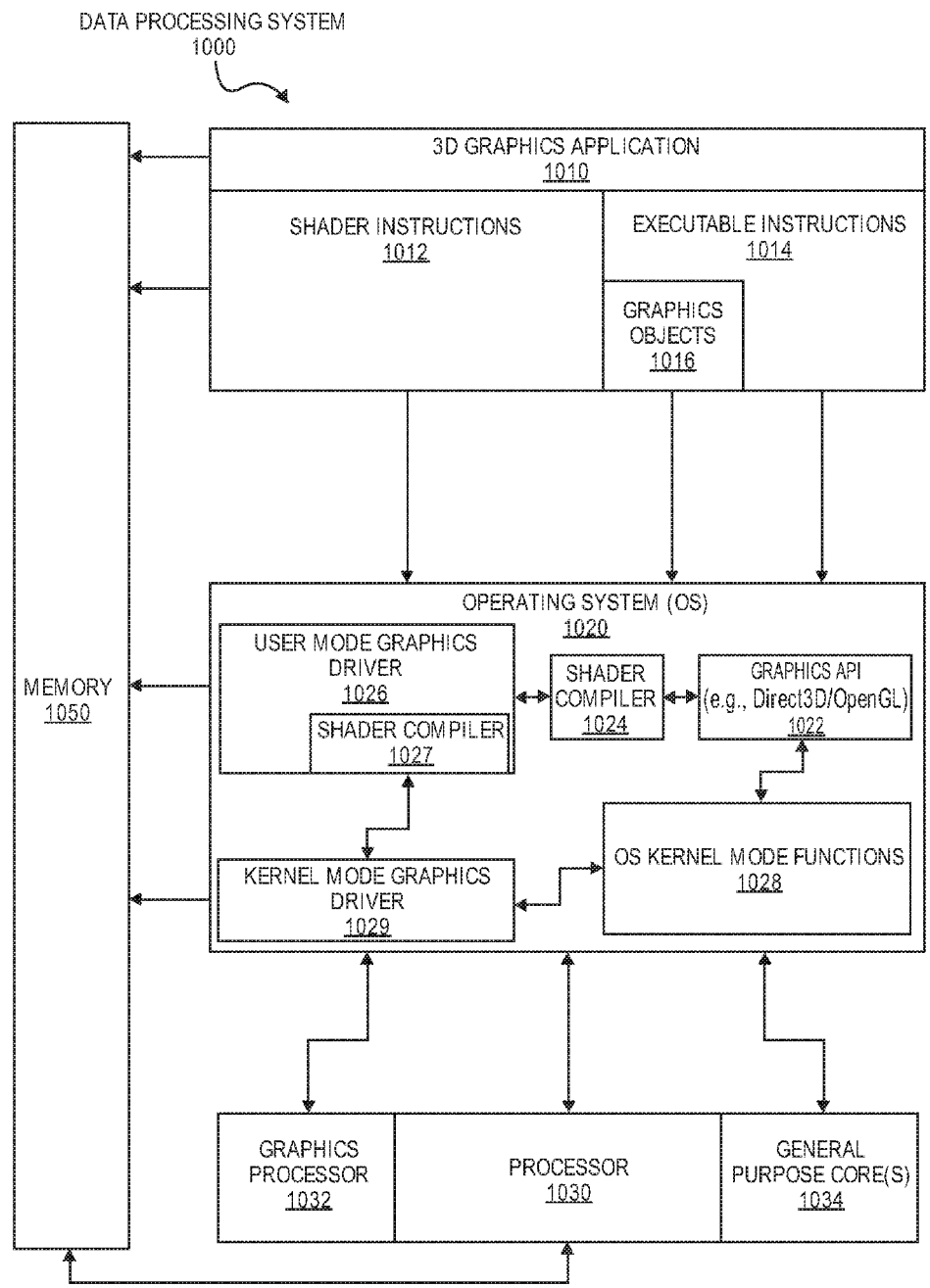
FIG. 10 illustrates exemplary graphics software architecture for a data processing system according to some embodiments.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API or the OpenGL API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
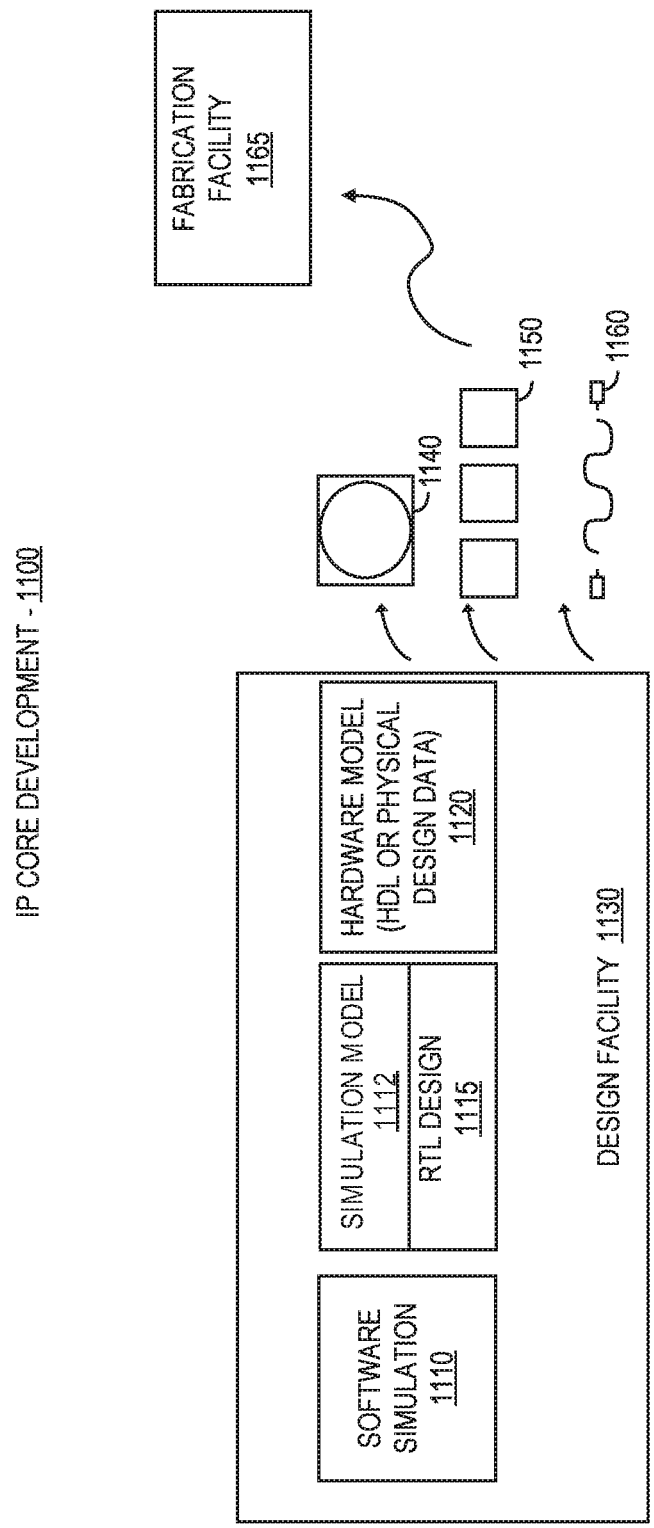
FIG. 11 is a block diagram illustrating an IP core development system that may be used to manufacture an integrated circuit to perform operations according to an embodiment.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a $3^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 12:
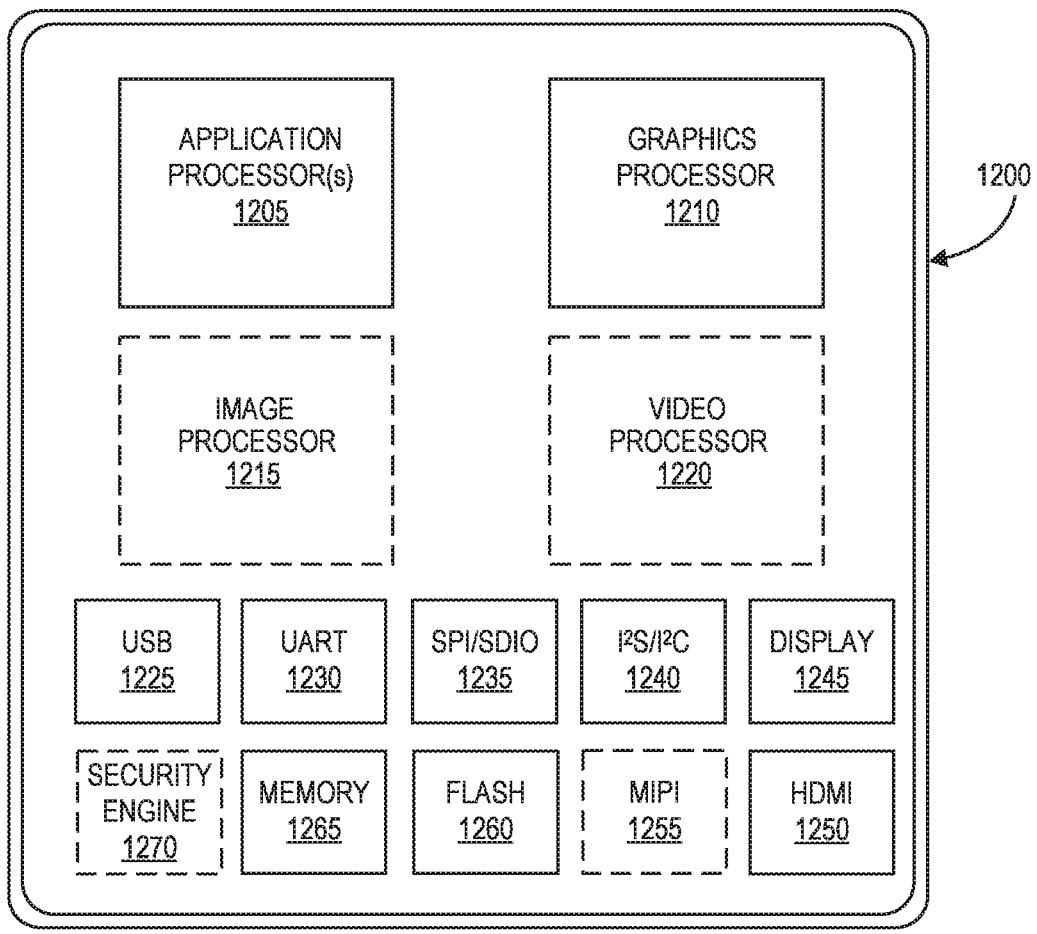
FIG. 12 is a block diagram illustrating an exemplary system on a chip integrated circuit that may be fabricated using one or more IP cores, according to an embodiment.

FIG. 12 is a block diagram illustrating an exemplary system on a chip integrated circuit 1200 that may be fabricated using one or more IP cores, according to an embodiment. The exemplary integrated circuit includes one or more application processors 1205 (e.g., CPUs), at least one graphics processor 1210, and may additionally include an image processor 1215 and/or a video processor 1220, any of which may be a modular IP core from the same or multiple different design facilities. The integrated circuit includes peripheral or bus logic including a USB controller 1225, UART controller 1230, an SPI/SDIO controller 1235, and an $I^2S/I^2C$ controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Additionally, other logic and circuits may be included in the processor of integrated circuit 1200, including additional graphics processors/cores, peripheral interface controllers, or general purpose processor cores.

Figure 13:
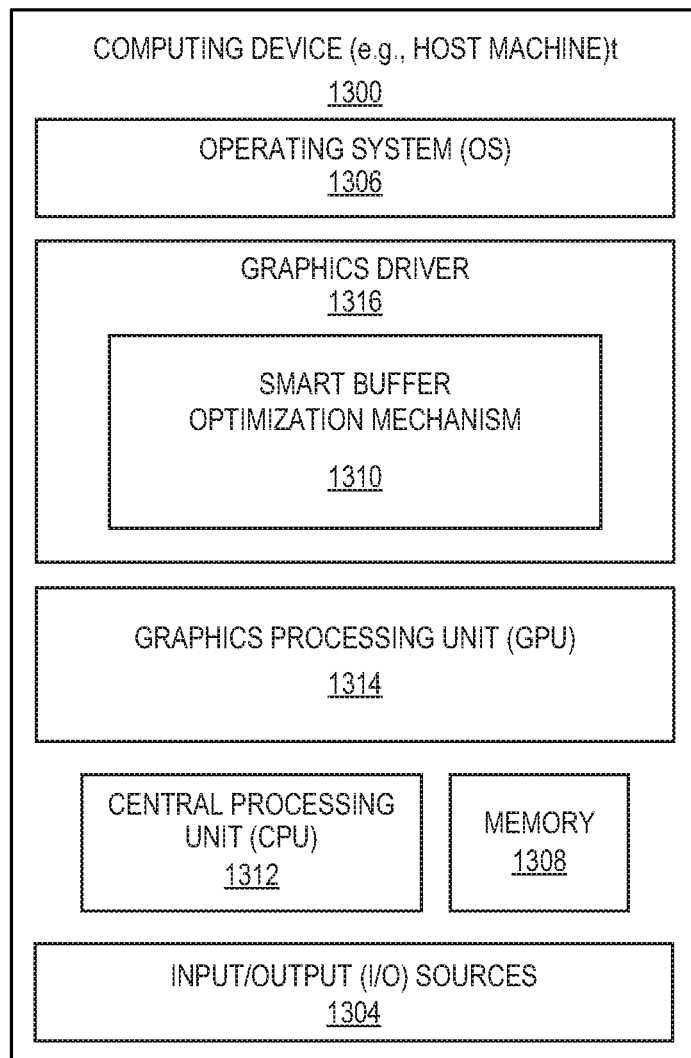
FIG. 13 illustrates a computing device employing a smart buffer optimization mechanism according to one embodiment.

FIG. 13 illustrates a computing device 1300 employing a smart buffer optimization mechanism ("smart buffer mechanism") 1310 according to one embodiment. Computing device 1300 (e.g., smart wearable devices, virtual reality (VR) devices, head-mounted display (HMDs), mobile computers, Internet of Things (IoT) devices, laptop computers, desktop computers, server computers, etc.) may be the same as data processing system 100 of FIG. 1 and accordingly, for brevity, clarity, and ease of understanding, many of the details stated above with reference to FIGS. 1-12 are not further discussed or repeated hereafter. As illustrated, in one embodiment, computing device 1300 is shown as hosting hybrid mechanism 1310.

In the illustrated embodiment, smart buffer mechanism 1310 is shown as being hosted by graphics driver 1316; however, it is contemplated that embodiments are not limited as such. For example, in one embodiment, smart buffer mechanism 1310 may be part of firmware of graphics processing unit ("GPU" or "graphics processor") 1314 or central processing unit ("CPU" or "application processor") 1312, in another embodiment, hosted by operating system 1306. In yet another embodiment, smart buffer mechanism 1310 may be a hardware component hosted by GPU 1314 or CPU 1312. In yet another embodiment, fast access mechanism 1310 may be partially and simultaneously hosted by multiple components of computing device 1300, such as one or more of graphics driver 1316, GPU 1314, GPU firmware, CPU 1312, CPU firmware, operating system 1306, and/or the like.

It is contemplated and to be noted that smart buffer mechanism 1310 is not merely applicable to or usable with graphics memory buffer or workloads having tasks relating to GPU 1314 and that it is equally applicable to or usable with any other memory buffers or workloads having tasks, such as relating to CPU 1312 and/or any number and type of other components of computing device 1300. However, for the sake of brevity and clarity, throughout this document, smart buffer mechanism 1310 is described with reference to graphics buffers but it is to be noted that embodiments are not limited as such.

Throughout the document, term "user" may be interchangeably referred to as "viewer", "observer", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

Computing device 1300 may include any number and type of communication devices, such as large computing systems, such as server computers, desktop computers, etc., and may further include set-top boxes (e.g., Internet-based cable television set-top boxes, etc.), global positioning system (GPS)-based devices, etc. Computing device 1300 may include mobile computing devices serving as communication devices, such as cellular phones including smartphones, personal digital assistants (PDAs), tablet computers, laptop computers, e-readers, smart televisions, television platforms, wearable devices (e.g., glasses, watches, bracelets, smartcards, jewelry, clothing items, etc.), media players, etc. For example, in one embodiment, computing device 1300 may include a mobile computing device employing a computer platform hosting an integrated circuit ("IC"), such as system on a chip ("SoC" or "SOC"), integrating various hardware and/or software components of computing device 1300 on a single chip.

As illustrated, in one embodiment, computing device 1300 may include any number and type of hardware and/or software components, such as (without limitation) GPU 1314, graphics driver (also referred to as "GPU driver", "graphics driver logic", "driver logic", user-mode driver (UMD), UMD, user-mode driver framework (UMDF), UMDF, or simply "driver") 1316, CPU 1312, memory 1308, network devices, drivers, or the like, as well as input/output (I/O) sources 1304, such as touchscreens, touch panels, touch pads, virtual or regular keyboards, virtual or regular mice, ports, connectors, etc. Computing device 1300 may include operating system (OS) 1306 serving as an interface between hardware and/or physical resources of the computer device 1300 and a user. It is contemplated that CPU 1312 may include one or processors, such as processor(s) 102 of FIG. 1, while GPU 1314 may include one or more graphics processors, such as graphics processor(s) 108 of FIG. 1.

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

It is contemplated and as further described with reference to FIGS. 1-12, some processes of the graphics pipeline as described above are implemented in software, while the rest are implemented in hardware. A graphics pipeline may be implemented in a graphics coprocessor design, where CPU 1312 is designed to work with GPU 1314 which may be included in or co-located with CPU 1312. In one embodiment, GPU 1314 may employ any number and type of conventional software and hardware logic to perform the conventional functions relating to graphics rendering as well as novel software and hardware logic to execute any number and type of instructions, such as instructions 121 of FIG. 1, to perform the various novel functions of smart buffer mechanism 1310 as disclosed throughout this document.

As aforementioned, memory 1308 may include a random access memory (RAM) comprising application database having object information. A memory controller hub, such as memory controller hub 116 of FIG. 1, may access data in the RAM and forward it to GPU 1314 for graphics pipeline processing. RAM may include double data rate RAM (DDR RAM), extended data output RAM (EDO RAM), etc. CPU 1312 interacts with a hardware graphics pipeline, as illustrated with reference to FIG. 3, to share graphics pipelining functionality. Processed data is stored in a buffer in the hardware graphics pipeline, and state information is stored in memory 1308. The resulting image is then transferred to I/O sources 1304, such as a display component, such as display device 320 of FIG. 3, for displaying of the image. It is contemplated that the display device may be of various types, such as Cathode Ray Tube (CRT), Thin Film Transistor (TFT), Liquid Crystal Display (LCD), Organic Light Emitting Diode (OLED) array, etc., to display information to a user.

Memory 1308 may comprise a pre-allocated region of a buffer (e.g., frame buffer); however, it should be understood by one of ordinary skill in the art that the embodiments are not so limited, and that any memory accessible to the lower graphics pipeline may be used. Computing device 1300 may further include input/output (I/O) control hub (ICH) 130 as referenced in FIG. 1, one or more I/O sources 1304, etc.

CPU 1312 may include one or more processors to execute instructions in order to perform whatever software routines the computing system implements. The instructions frequently involve some sort of operation performed upon data. Both data and instructions may be stored in system memory 1308 and any associated cache. Cache is typically designed to have shorter latency times than system memory 1308; for example, cache might be integrated onto the same silicon chip(s) as the processor(s) and/or constructed with faster static RAM (SRAM) cells whilst the system memory 1308 might be constructed with slower dynamic RAM (DRAM) cells. By tending to store more frequently used instructions and data in the cache as opposed to the system memory 1308, the overall performance efficiency of computing device 1300 improves. It is contemplated that in some embodiments, GPU 1314 may exist as part of CPU 1312 (such as part of a physical CPU package) in which case, memory 1308 may be shared by CPU 1312 and GPU 1314 or kept separated.

System memory 1308 may be made available to other components within the computing device 1300. For example, any data (e.g., input graphics data) received from various interfaces to the computing device 1300 (e.g., keyboard and mouse, printer port, Local Area Network (LAN) port, modem port, etc.) or retrieved from an internal storage element of the computer device 1300 (e.g., hard disk drive) are often temporarily queued into system memory 1308 prior to their being operated upon by the one or more processor(s) in the implementation of a software program. Similarly, data that a software program determines should be sent from the computing device 1300 to an outside entity through one of the computing system interfaces, or stored into an internal storage element, is often temporarily queued in system memory 1308 prior to its being transmitted or stored.

Further, for example, an ICH, such as ICH 130 of FIG. 1, may be used for ensuring that such data is properly passed between the system memory 1308 and its appropriate corresponding computing system interface (and internal storage device if the computing system is so designed) and may have bi-directional point-to-point links between itself and the observed 110 sources/devices 1304. Similarly, an MCH, such as MCH 116 of FIG. 1, may be used for managing the various contending requests for system memory 1308 accesses amongst CPU 1312 and GPU 1314, interfaces and internal storage elements that may proximately arise in time with respect to one another.

I/O sources 1304 may include one or more I/O devices that are implemented for transferring data to and/or from computing device 1300 (e.g., a networking adapter); or, for a large scale non-volatile storage within computing device 1300 (e.g., hard disk drive). User input device, including alphanumeric and other keys, may be used to communicate information and command selections to GPU 1314. Another type of user input device is cursor control, such as a mouse, a trackball, a touchscreen, a touchpad, or cursor direction keys to communicate direction information and command selections to GPU 1314 and to control cursor movement on the display device. Camera and microphone arrays of computer device 1300 may be employed to observe gestures, record audio and video and to receive and transmit visual and audio commands.

Computing device 1300 may further include network interface(s) to provide access to a network, such as a LAN, a wide area network (WAN), a metropolitan area network (MAN), a personal area network (PAN), Bluetooth, a cloud network, a mobile network (e.g., $3^{rd}$ Generation (3G), $4^{th}$ Generation (4G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Network interface(s) may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported. In addition to, or instead of, communication via the wireless LAN standards, network interface(s) may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing device 1300 may vary from implementation to implementation depending upon numerous factors, such as price constraints, performance requirements, technological improvements, or other circumstances. Examples of the electronic device or computer system 1300 may include (without limitation) a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Figure 14A:
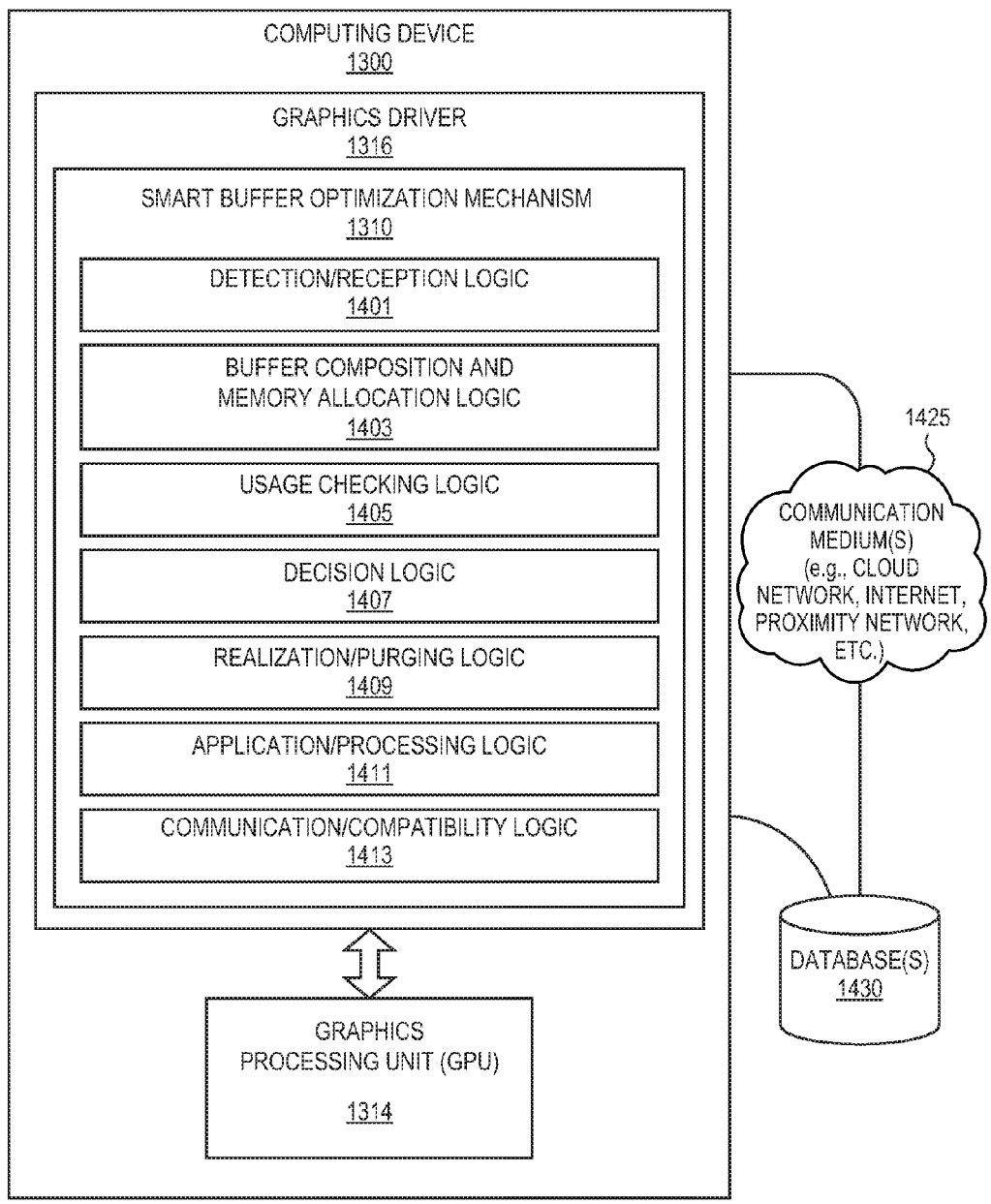
FIG. 14A illustrates a smart buffer optimization mechanism according to one embodiment.

FIG. 14A illustrates smart buffer mechanism 1310 of FIG. 13 according to one embodiment. For brevity, many of the details already discussed with reference to FIGS. 1-13 are not repeated or discussed hereafter. In one embodiment, smart buffer mechanism 1310 may include any number and type of components, such as (without limitations): detection/reception logic 1401; buffer composition and memory allocation logic ("buffer memory logic") 1403; usage checking logic 1405; decision logic 1407; realization/purging logic 1409; application/processing logic 1411; and communication/compatibility logic 1413.

Computing device 1300 is further shown to be in communication with one or more repositories, datasets, and/or databases, such as database(s) 1430 (e.g., cloud storage, non-cloud storage, etc.), where database(s) 1430 may reside at a local storage or a remote storage over communication medium(s) 1425, such as one or more networks (e.g., cloud network, proximity network, mobile network, intranet, Internet, etc.).

It is contemplated that a software application running at computing device 1300 may be responsible for performing or facilitating performance of any number and type of tasks using one or more components (e.g., GPU 1314, CPU 1312, etc.) of computing device 1300. When performing such tasks, as defined by the software application, it is customary for one or more relevant components, such as allocation components, relating to the software application to request a certain amount of memory for which, memory buffers are allocated. Upon having allocated the memory buffers, the allocation component's composition of buffers may be used to perform any relevant tasks in compliance with the nature and purpose of the software application. However, in some cases, any memory associated with such buffers may go unused, resulting in wastage of memory and/or other resources.

Embodiments provide for a novel technique to release some or all of the memory associated with buffers without any intervention or knowledge of their allocation components such that the released memory is regarded as relinquished and offered for use by other tasks and/or components relating to any number and type of software applications and/or computing device 1300.

For example, a software application at computing device 1300 may request one or more tasks (e.g., frame processing and displaying) to be performed by one or more components (e.g., graphics driver 1316, GPU 1314, etc.) which facilitates buffer memory logic 1403 to facilitate an allocation component (e.g., surface flinger) to allocate composition buffers to perform one or more operations or compositions, such as frame processing. In one embodiment, detection/reception logic 1401 continuously detects or monitors the software application and the performance of its relevant one or more tasks, where such detection further includes detecting and identifying buffer allocations facilitated by allocation components for purpose of task composition. For example, using the aforementioned frame example, detection/reception logic 1401 identifies which buffer allocations are made by the allocation component for the purpose of frame composition.

Upon receiving the request for the one or more tasks from the software application, buffer memory logic 1403 is triggered to facilitate one or more allocation components, such as a surface flinger, to allocate a composition of buffers such that the composition is appropriate and sufficient for the one or more tasks. Once the composition is formed, memory to the buffers may be allocated, such as buffer memory logic 1403 facilitates one or more relevant components, such as display drivers, memory allocation drivers, etc., to allocate memory to the composition buffers. As will be further described later in this document, this memory may be committed or uncommitted depending on the use or lack thereof of the composition buffers.

For example, usage checking logic 1405 may be used to continuously or periodically (such as upon passing of predetermined period of time) check on the ongoing usage of allocated composition buffers to determine whether one or more of the composition buffers were still needed for certain tasks. For example, usage checking logic 1405 may be triggered to continuously or periodically (such as upon passing of predetermined period of time) check on the composition buffers to determine whether the buffer is being used for the intended purpose as composed by the allocation component, such as a surface flinger.

It is contemplated and to be noted that an allocation component, as referenced in this document, is not limited to merely surface flinger or any other particular type of allocation component. For example, an allocation component may include any number and type of software and/or hardware components of computing device 1300 that are responsible for or work to consume memory from buffers from buffer queues. For example, a display services-related software and/or hardware component (e.g., Open Graphics Library for Embedded Systems (OpenGL ES) applications, surface flingers, other consumer components, etc.) may work in communication with graphics driver 1316 and/or GPU 1314 to process and render graphics data into visual displays for the user to view on their respective computing device.

Further, for example, any number of stream producer components or simply producers, such as cameras, media players, OpenGL ES applications, etc., may be responsible for producing buffers that are then queued in a buffer queue prior to be acquired by consumer components or simply consumers, such as OpenGL ES App, surface flinger, etc.), where these buffers are then released by consumers into the buffer queue prior to being dequeued by the producers. Similarly, various producers, such as renderers, may produce graphics buffers for various tasks, such as providing user interface, home screen, etc., where the buffers are queued in a buffer queue and subsequently, composited by the allocation component in communication with one or more graphics components, such as GPU 1314, and taken to a final rendering, such as displaying by a display controller, by a software and/or hardware composer, such as graphics driver 1316.

For example, one or more allocation components (such as a surface flinger) may allocate composition buffers to be used by one or more hardware and/or software composers (e.g., graphics driver) for one or more display tasks, where the composition buffers may then be used for allocation of memory by one or more software and/or hardware memory allocation drivers (e.g., graphics memory allocators, such as Gralloc driver), display drivers (e.g., Direct Rendering Manager, such as low-level kernel display driver), and/or the like, as necessitated or desired to perform the one or more display tasks. For example, some of the composition buffers may be allocated memory to serve as first driver buffers (e.g., Gralloc buffers), second driver buffers (e.g., DRM buffers), etc.

Referring back to smart buffer mechanism 1310, for example, graphics driver 1316 may be responsible for performing the intended tasks and accordingly, in one embodiment, usage checking logic 1405 may call upon graphics driver 1316 to determine whether the intended task or operation is being performed is expected to be performed in the near future.

Any information collected or obtained by usage checking logic 1405 is then forwarded on to decision logic 1407 that is then responsible for making a decision regarding whether the buffer (e.g., graphics buffer having memory associated with it) be kept on or released so that the associated memory may be relinquished to be used by other processes being requested by other software and/or hardware components, such as task relating to the software application, other software applications, and/or any of the software and/or hardware components of computing system 1300.

For example, if the information collected by usage checking logic 1405 identifies or indicates that the composition buffers are being currently used or expected to be used in the near future, then realization/purging logic 1409 is triggered to realize the composition buffers to serve as allocation buffers and to be used by one or more relevant drivers, such as a display driver, as facilitate by graphics driver 1316. For example, realization may refer to a process where a buffer, such as a graphics buffer, acquires the relevant physical memory pages for a realized operation or task. For example, buffer memory logic 1403 may issue a call to an allocation driver (e.g., DRM driver) through its application programming interface (API) to facilitate it to implement the realized operation by (fallocating) committing a physical memory page for each corresponding logical page.

As previously described, realizing of one or more buffers, as facilitated by realization/purging logic 1409, may include committing or allowing commitment of physical memory or at least a portion of the physical memory to the one or more buffers in accordance with allocation or association of the physical memory or its portion to the one or more buffers as facilitated by buffer memory logic 1403. Further, for example, this committed (portion of the) physical memory may then be used by one or more components (e.g., graphics driver, etc.) of computing device 1300 to perform one or more operations relating to the task requested by the software application at computing device 1300.

If, however, the information collected by usage checking logic 1405 identifies or indicates that at least one or more of the composition buffers are not being used or expected to be used in the near future, then realization/purging logic 1409 may be triggered to purge the one or more of the composition buffers so that they may be released and used for other purposes or tasks. For example, purging may refer to a process where a buffer, such as a graphics buffer, may release the relevant physical memory pages previously reserved for the buffer, allowing that physical memory to be used elsewhere. For example, buffer memory logic 1403 may issue a call to the allocation driver (e.g., DRM driver) through its API to implement the purge operation by (fallocating) uncommitting the physical memory pages associated with the allocated composition buffers. Further, for example, a DRM driver may remap all the allocation's logical pages to share a common physical page, where this embodiment may lead to success of all accesses should the buffer be used (such as for read and/or write operations).

As previously described, purging of one or more buffers, as facilitated by realization/purging logic 1409, may include uncommitting or disallowing commitment of the physical memory or at least a portion of the physical memory to the one or more buffers despite the physical memory or its portion being allocated to or associated with the one or more buffers as facilitated by buffer memory logic 1403. Further, for example, this uncommitted (portion of) the physical memory may not be used for the current task and instead remain available to be used for one or more other tasks requested by the software application or other software applications at computing device 1300.

In one embodiment, once any of the composition buffer are either realized or purged, application/processing logic 1411 may then be triggered to apply the realization/purging policy and communicate with other components, such as graphics driver 1316, GPU 1314, etc., of computing device 1300 to perform one or more subsequent processes, such as with regard to frame composition example, continue with various frame processing tasks, such as setting or preparing of frames, presenting of frames for display, displaying of frames, storing of frames, etc.

For example, with regard to setting or preparing of frames, this processes may be optional and, in some cases, dependent on the host system, such as computing device 1300, and/or services providers, such as companies or business providing various services (e.g., data services, applications, phone services, gaming, etc.) on the host system. For example, in some embodiments, a list of layers may be prepared prior to each frame presentation and depending on display capabilities, some layers from the list may need to be pre-processed or combined, such as to modify the layer buffer format or simply to reduce the total number of layers, which may be referred to as composition. Some of the local hardware and/or software components or composers, such as a hardware and/or software composer, may be used to perform composition using their own internal engines and/or an allocation component, such as a surface flinger. For example, a hardware and/or software composer may indicate to the allocation component regarding which layers are to be composed.

Similarly, with regard to setting, the allocation component may call various relevant local software and/or hardware components to present the frames to a display device to display the frames. For example, on entry, the allocation component may already have issued the work to compose all the layers that the hardware and/or software composer has previously tagged for the allocation component composition, where the allocation component composition output buffer is provided as part of a setting call. Further, for example, the composer may present a complete frame to the display device by combining its retained layers with the allocation component-provided composition output buffer. In some embodiments, an allocation component may be used for composition of frames such that it may be valid to uncommit and then commit memory pages without preserving the buffer contents. However, if, for example, the previous contents are to be persisted, then, in another embodiment, the buffer allocation may be compressed during the periods it may not be used as opposed to fully discarding or purging its memory.

It is contemplated that embodiments are not limited to any particular types of applications, components, or tasks and these embodiments may be equally applicable to and used with any number and type of applications, components, and tasks. For example, embodiments are not limited to any particular application components like surface flinger; allocation drivers like DRM driver, Gralloc driver, etc.; hardware and/or software composers; various operations, such as preparation, setting, frame presenting or displaying; various tasks, like frame composition and presentation; and/or the like, but that these are discussed throughout this document for brevity and clarity and to provide ease of understanding.

It is contemplated and as previously described, components—1413 of smart buffer mechanism 1310 may be employed as software, hardware, or a combination thereof, such as firmware.

Communication/compatibility logic 1413 may be used to facilitate dynamic communication and compatibility between computing device 1300 and any number and type of other computing devices (such as mobile computing device, desktop computer, server computing device, etc.); processing devices or components (such as CPUs, GPUs, etc.); capturing/sensing/detecting devices (such as capturing/sensing components including cameras, depth sensing cameras, camera sensors, RGB sensors, microphones, etc.); display devices (such as output components including display screens, display areas, display projectors, etc.); user/context-awareness components and/or identification/verification sensors/devices (such as biometric sensors/detectors, scanners, etc.); database(s) 1430, such as memory or storage devices, databases, and/or data sources (such as data storage devices, hard drives, solid-state drives, hard disks, memory cards or devices, memory circuits, etc.); communication medium(s) 1425, such as one or more communication channels or networks (e.g., Cloud network, the Internet, intranet, cellular network, proximity networks, such as Bluetooth, Bluetooth low energy (BLE), Bluetooth Smart, Wi-Fi proximity, Radio Frequency Identification (RFID), Near Field Communication (NFC), Body Area Network (BAN), etc.); wireless or wired communications and relevant protocols (e.g., Wi-Fi®, WiMAX, Ethernet, etc.); connectivity and location management techniques; software applications/websites (e.g., social and/or business networking websites, etc., business applications, games and other entertainment applications, etc.); and programming languages, etc., while ensuring compatibility with changing technologies, parameters, protocols, standards, etc.

Throughout this document, terms like "logic", "component", "module", "framework", "engine", "mechanism", and the like, may be referenced interchangeably and include, by way of example, software, hardware, and/or any combination of software and hardware, such as firmware. In one example, "logic" may refer to or include a software component that is capable of working with one or more of an operating system (e.g., operating system 1306), a graphics driver (e.g., graphics driver 1316), etc., of a computing device, such as computing device 1300. In another example, "logic" may refer to or include a hardware component that is capable of being physically installed along with or as part of one or more system hardware elements, such as an application processor (e.g., CPU 1312), a graphics processor (e.g., GPU 1314), etc., of a computing device, such as computing device 1300. In yet another embodiment, "logic" may refer to or include a firmware component that is capable of being part of system firmware, such as firmware of an application processor (e.g., CPU 1312) or a graphics processor (e.g., GPU 1314), etc., of a computing device, such as computing device 1300.

Further, any use of a particular brand, word, term, phrase, name, and/or acronym, such as "GPU", "GPU domain", "GPGPU", "CPU", "CPU domain", "graphics driver", "workload", "application", "frame", "work unit", "draw", "dispatch", "API", "hardware", "software", "agent", "graphics driver", "kernel mode graphics driver", "user-mode driver", "user-mode driver framework", "buffer", "graphics buffer", "allocation component", "allocation driver", "composition buffer", "purge" or "purging", "realize" or "realizing", "task", "operation", "software application", "game", etc., should not be read to limit embodiments to software or devices that carry that label in products or in literature external to this document.

It is contemplated that any number and type of components may be added to and/or removed from smart buffer mechanism 1310 to facilitate various embodiments including adding, removing, and/or enhancing certain features. For brevity, clarity, and ease of understanding of smart buffer mechanism 1310, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 14B:
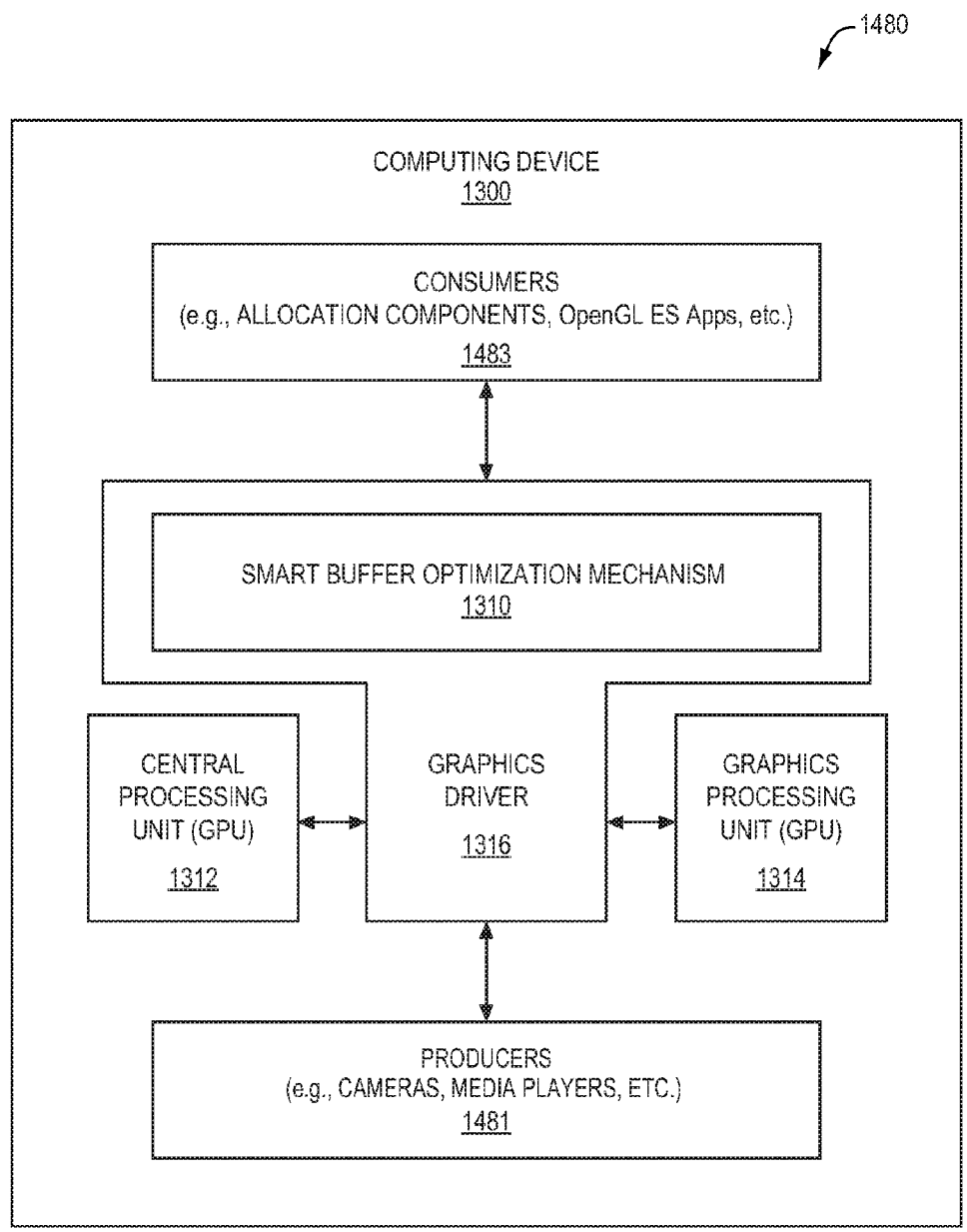
FIG. 14B illustrates an architectural placement according to one embodiment.

FIG. 14B illustrates an architectural placement ("placement") 1480 according to one embodiment. For brevity, many of the details discussed previously discussed with reference to FIGS. 1-14A may not be discussed or repeated hereafter. Further, it is contemplated and to be noted that embodiments are not limited to any particular architectural setup or placement of components, such as placement 1480.

As previously described with regard to FIGS. 13 and 14A that smart buffer mechanism 1310 is not limited to being hosted by graphics driver 1316, but that for the sake of brevity and clarify, throughout this document, it is illustrated and discussed as such. In this illustration of architectural placement 1480, smart buffer mechanism 1310 is shown as being hosted by graphics driver 1316 which is shown as being in communication with CPU 1312 and GPU 1314. In one embodiment, graphics driver 1316 is further in communication with one or more producers 1481 of images and/or image streams, such as cameras, media players, etc., of I/O sources 1304 of FIG. 13, and one or more consumers 1483 of images and/or image streams, such as allocation components, OpenGL ES applications, etc., at computing device 1300.

FIG. 15 illustrates a method 1500 for facilitating buffer optimization at computing devices according to one embodiment. Method 1500 may be performed by processing logic that may comprise hardware (e.g., circuitry, dedicated logic, programmable logic, etc.), software (such as instructions run on a processing device), or a combination thereof, as facilitated by smart buffer mechanism 1310 of FIG. 13. The processes of method 1500 are illustrated in linear sequences for brevity and clarity in presentation; however, it is contemplated that any number of them can be performed in parallel, asynchronously, or in different orders. For brevity, many of the details discussed with reference to FIGS. 1-14B may not be discussed or repeated hereafter.

Method 1500 begins at block 1501. Allocation component (e.g., surface flinger) allocates composition buffers for a task, such as processing of frames at a computing device for displaying at a display device. Upon framing in, in one embodiment, at block 1503, a determination is made as to whether the composition relating to buffers allocated by the allocation component is needed now or any further in the near future. At block 1505, in one embodiment, if the composition is not needed at this point or any further in the near future, any graphics buffers associated with the composition, as facilitated by the allocation component, are purged and, at block 1507, the processing continues with frame processing of a frame without the composition, such as the graphics buffers. Method 1500 then continues at block 1513 with presentation of the frame to a display device for display, which then leads to framing out to block 1515 where the frame is displayed and/or stored.

Referring back to block 1503, if the composition is needed at this point or at anytime in the near future, any graphics buffers associated with the composition, as facilitated by the allocation component, are realized at block 1509 and, at block 1511, the processing continues with frame processing of the frame with or using the composition, such as the graphics buffers. Method 1500 then continues at block 1513 with presentation of the frame to a display device for display, which then leads to framing out to block 1515 where the frame is displayed and/or stored.

Referring back to allocation component 1501, it may allocate or associated physical memory to buffers, such as graphics buffer, where at block 1503, a determination is made as to the current usage or use requirements, such as whether the allocation component composition of the physical memory to the buffers is need to perform any necessary operations relating to the task requested by the software application at the computing device.

In one embodiment, realizing of the allocation component (graphics) buffers may include committing or allowing commitment of at least a portion of the allocated physical memory to at least one or more buffers in accordance with the allocation component composition. This committed portion of the physical memory may then be used by one or more components (e.g., graphics driver, etc.) of the computing device to perform one or more operations relating to the task requested by the software application at the computing device.

In one embodiment, purging of the allocation component graphics buffers may include uncommitting or disallowing commitment of at least a portion of the allocated physical memory to at least one or more buffers despite the portion of physical memory being allocated to or associated with the one or more buffers according to the allocation component composition. This purged or uncommitted portion of physical memory may not be used for the given task and thus remain available to be used for one or more other tasks requested by the software application or other software applications at the computing device.

Figure 16:
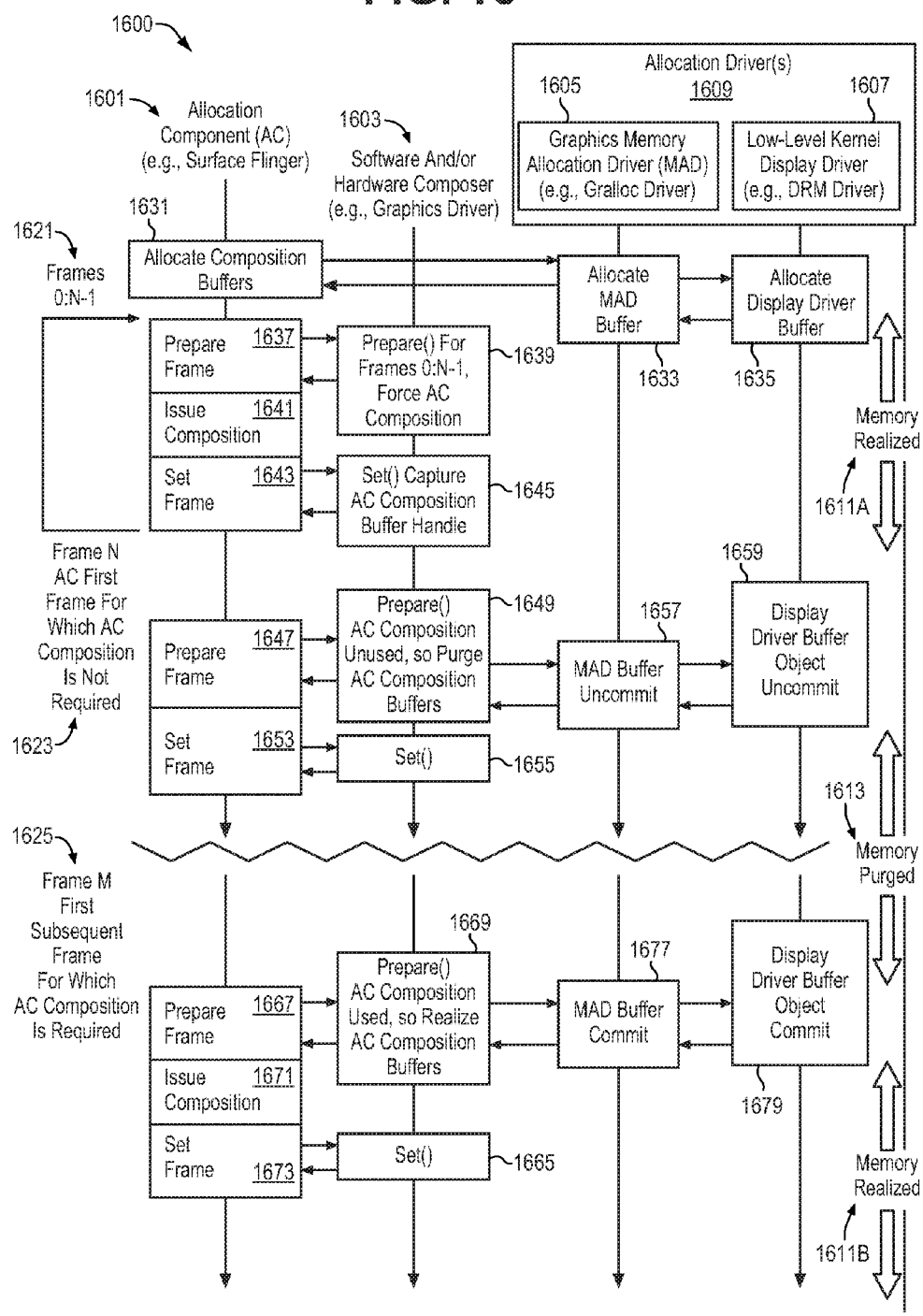
FIG. 16 illustrates a transaction sequence for facilitating buffer optimization at computing devices according to one embodiment.

FIG. 16 illustrates a transaction sequence 1600 for facilitating buffer optimization at computing devices according to one embodiment. Transaction sequence 1600 may be performed by processing logic that may comprise hardware (e.g., circuitry, dedicated logic, programmable logic, etc.), software (such as instructions run on a processing device), or a combination thereof, as facilitated by smart buffer mechanism 1310 of FIG. 13. The processes of transaction sequence 1600 are illustrated in linear sequences for brevity and clarity in presentation; however, it is contemplated that any number of them can be performed in parallel, asynchronously, or in different orders. For brevity, many of the details discussed with reference to FIGS. 1-15 may not be discussed or repeated hereafter.

Transaction sequence 1600 provides any number and type of transactions relating to memory realization 1611A, 1611B, memory purging 1613, etc., as they relate to frames 0: N−1 1621, frame N 1623, and frame M 1625. Further, transaction sequence 1600 provides for transactions between any number and type of hardware and/or software components, such as upper or allocation component 1601 (e.g., surface flinger, etc.), hardware and/or software composer 1603 (e.g., graphics driver), and allocation driver(s) 1609, such as graphics memory allocation driver ("MAD" or simply "memory allocator") 1605 (e.g., Gralloc driver), and low-level kernel display driver 1607 (e.g., DRM driver).

In the illustrated embodiment, a sequence of any number of frames is to be processed without wasting any unused graphics memory buffers, smart buffer mechanism 1310 of FIG. 13 is triggered to ensure optimization of such buffers.

For example, as previously described, allocation component 1601 forms a composition by allocating composition buffers at 1631, where any memory allocation to these buffers may be performed by one or more relevant allocation driver(s) 1609, such as memory allocation driver 1605 and display driver 1607, etc.

In one embodiment, smart buffer mechanism 1310 of FIG. 13 facilitating composer 1603 may be capable of precisely controlling when, in one embodiment, allocation component 1601 may identify all the composition output buffers at 1631 in allocation component composition flip-chain by facilitating allocation component composition for first N frames 0:N−1 1621, where N is equal to or greater than allocation component flip-chain length (e.g., N=3 if allocation component 1601 is triple-buffered, etc.). Since the composition buffers of 1631 are needed for frames 0:N−1 1621, the composition is realized at 1611A. For example, upon realization at 1611A, a number of processes may be performed for processing of frames, such as preparation of a frame at 1637 and correspondingly by ensuring the composition at 1639 as facilitated by composer 1603, issuing of the composition at 1641, setting of the frame at 1643 and correspondingly by ensuring capture of the composition buffer handle at 1645 as facilitated by composer 1645. In some embodiments, memory allocations to the allocated composition buffers may be made at 1633 and 1635 by memory allocation driver 1605 and display driver 1607, respectively, in response to the placement of the issue composition command at 1641.

Now, with regard to frames N 1623, in one embodiment, if the allocation component composition output buffers of 1631 are not used, the composition may then be purged at 1613, leading preparing of a frame 1647 and setting of the frame 1653 at allocation component 1601 to preparation for purging of the composition at 1649 and setting of it at 1655 at composer 1603, respectively, followed by uncommitting of memory allocations through memory allocation driver 1605 and display driver 1607, respectively, by composer 1603, as facilitated by smart buffer mechanism 1310 of FIG. 13, issuing a request to allocation driver(s) 1609 to uncommit all the memory pages that were previously committed to the buffers.

For frames M 1625, the composition may need to be realized again at 1611B by repeating the earlier processes of preparation of a frame at 1667 and correspondingly by ensuring the composition at 1669 as facilitated by composer 1603, issuing of the composition at 1671, setting of the frame at 1673 and correspondingly by ensuring capture of the composition buffer handle at 1665 as facilitated by composer 1665. In one embodiment, memory allocations to the allocated composition buffers may be made at 1677 and 1679 by memory allocation driver 1605 and display driver 1607, respectively, in response to the placement of the issue composition command at 1671.

Further, for example, embodiments may provide for: 1) a technique by which a driver determines that an operating system or an application may not require a driver buffer to be in a form that is optimal for active use (e.g., the buffer may not need to be fully realized); and 2) another technique to minimize buffer resources for periods when it may not need to be optimal.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the foregoing specification, embodiments have been described with reference to specific exemplary embodiments thereof. It will, however, be evident that various modifications and changes may be made thereto without departing from the broader spirit and scope of embodiments as set forth in the appended claims. The Specification and drawings are, accordingly, to be regarded in an illustrative rather than a restrictive sense.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes an apparatus to facilitate smart optimization of unused graphics buffer memory in computing environments, comprising: detection/reception logic to detect a software application at a computing device, wherein the software application to place a request for a task capable of being executed by a processor of the computing device; buffer composition and memory allocation logic ("buffer memory logic") to allocate a composition of buffers and facilitate allocation of physical memory to the buffers to be used to perform the task, wherein a first portion of the physical memory and a second portion of the physical memory are allocated to first one or more of the buffers and second one or more of the buffers, respectively; and realization/purging logic to purge first one or more of the buffers, if the first one or more of the buffers are determined to be unused for the task, wherein purging includes disallowing commitment of the first portion of the physical memory to the first one or more of the buffers such that the first portion of the physical memory remains available for other tasks despite being allocated to the first one or more of the buffers.

Example 2 includes the subject matter of Example 1, wherein the realization/purging logic is further to realize the second one or more of the buffers, if the second one or more of the buffers are determined to be used for the task, wherein realizing includes allowing commitment of the second portion of the physical memory to the second one or more of the buffers in accordance with the allocation of the second portion of the physical memory to the second one or more of the buffers.

Example 3 includes the subject matter of Example 1, wherein the buffer memory logic to facilitate an allocation component to prepare the composition of buffers based on one or more characteristics of the task or one or more task performance components of the computing device, wherein the one or more tasks performance components include the processor, wherein the processor includes at least one of a graphics processor, an application processor, a media processor, or a set of compute cores, wherein the buffer memory logic is further to facilitate one or more allocation drivers to allocate the physical memory to the buffers, wherein the one or more allocation drivers include at least one of a memory allocation driver, a display driver, or a graphics driver.

Example 4 includes the subject matter of Example 3, wherein the buffer memory logic is further to facilitate the one or more allocation drivers to: uncommit the first portion of the physical memory associated with the first one or more of the buffers; and commit the second portion of the physical memory associated with the second one or more of the buffers.

Example 5 includes the subject matter of Example 1, further comprising: a usage checking logic to continuously or periodically check on current usage of the buffers, wherein checking includes calling on the one or more tasks performance components to accurately determine the current usage of the buffers as performed by the one or more tasks performance components, wherein the usage checking logic is further to continuously or periodically check on expected usage of the buffers by the one or more tasks performance components.

Example 6 includes the subject matter of Example 5, further comprising: decision logic to distinguish between the first one or more of the buffers and the second one or more of the buffers based on at least one of the current usage or the expected usage of the buffers.

Example 7 includes the subject matter of Example 1, wherein the first portion of the physical memory is made available to be used by one or more of the other tasks other task requested by the software application or other software applications.

Example 8 includes the subject matter of Example 1, further comprising: application/processing logic to facilitate the performance of the task using the second one or more of the buffers, wherein the performance of the task leads to completion of the task.

Some embodiments pertain to Example 9 that includes a method for facilitating smart optimization of unused graphics buffer memory in computing environments, comprising: detecting a software application at a computing device, wherein the software application to place a request for a task capable of being executed by a processor of the computing device; allocating a composition of buffers and facilitate allocation of physical memory to the buffers to be used to perform the task, wherein a first portion of the physical memory and a second portion of the physical memory are allocated to first one or more of the buffers and second one or more of the buffers, respectively; and purging first one or more of the buffers, if the first one or more of the buffers are determined to be unused for the task, wherein purging includes disallowing commitment of the first portion of the physical memory to the first one or more of the buffers such that the first portion of the physical memory remains available for other tasks despite being allocated to the first one or more of the buffers.

Example 10 includes the subject matter of Example 9, further comprising: realizing the second one or more of the buffers, if the second one or more of the buffers are determined to be used for the task, wherein realizing includes allowing commitment of the second portion of the physical memory to the second one or more of the buffers in accordance with the allocation of the second portion of the physical memory to the second one or more of the buffers.

Example 11 includes the subject matter of Example 9, further comprising: facilitating an allocation component to prepare the composition of buffers based on one or more characteristics of the task or one or more task performance components of the computing device, wherein the one or more tasks performance components include the processor, wherein the processor includes at least one of a graphics processor, an application processor, a media processor, or a set of compute cores; and facilitating one or more allocation drivers to allocate the memory to the buffers, wherein the one or more allocation drivers include at least one of a memory allocation driver, a display driver, or a graphics driver.

Example 12 includes the subject matter of Example 11, further comprising: facilitating the one or more allocation drivers to: uncommit the first portion of the physical memory associated with the first one or more of the buffers; and commit the second portion of the physical memory associated with the second one or more of the buffers.

Example 13 includes the subject matter of Example 9, further comprising: continuously or periodically checking on current usage of the buffers, wherein checking includes calling on the one or more tasks performance components to accurately determine the current usage of the buffers as performed by the one or more tasks performance components; and continuously or periodically check on expected usage of the buffers by the one or more tasks performance components.

Example 14 includes the subject matter of Example 13, further comprising: distinguishing between the first one or more of the buffers and the second one or more of the buffers based on at least one of the current usage or the expected usage of the buffers.

Example 15 includes the subject matter of Example 9, wherein the first portion of the memory is made available to be used by one or more of the other tasks other task requested by the software application or other software applications.

Example 16 includes the subject matter of Example 9, further comprising: facilitating the performance of the task using the second one or more of the buffers, wherein the performance of the task leads to completion of the task.

Some embodiments pertain to Example 17 includes a system comprising a storage device having instructions, and a processor to execute the instructions to perform or facilitate a mechanism to perform one or more operations comprising: detecting a software application at a computing device, wherein the software application to place a request for a task capable of being executed by a processor of the computing device; allocating a composition of buffers and facilitate allocation of physical memory to the buffers to be used to perform the task, wherein a first portion of the physical memory and a second portion of the physical memory are allocated to first one or more of the buffers and second one or more of the buffers, respectively; and purging first one or more of the buffers, if the first one or more of the buffers are determined to be unused for the task, wherein purging includes disallowing commitment of the first portion of the physical memory to the first one or more of the buffers such that the first portion of the physical memory remains available for other tasks despite being allocated to the first one or more of the buffers.

Example 18 includes the subject matter of Example 17, wherein the one or more operations further comprise: realizing the second one or more of the buffers, if the second one or more of the buffers are determined to be used for the task, wherein realizing includes allowing commitment of the second portion of the physical memory to the second one or more of the buffers in accordance with the allocation of the second portion of the physical memory to the second one or more of the buffers.

Example 19 includes the subject matter of Example 17, wherein the one or more operations further comprise: facilitating an allocation component to prepare the composition of buffers based on one or more characteristics of the task or one or more task performance components of the computing device, wherein the one or more tasks performance components include the processor, wherein the processor includes at least one of a graphics processor, an application processor, a media processor, or a set of compute cores; and facilitating one or more allocation drivers to allocate the memory to the buffers, wherein the one or more allocation drivers include at least one of a memory allocation driver, a display driver, or a graphics driver.

Example 20 includes the subject matter of Example 19, wherein the one or more operations further comprise: facilitating the one or more allocation drivers to: uncommit the first portion of the physical memory associated with the first one or more of the buffers; and commit the second portion of the physical memory associated with the second one or more of the buffers.

Example 21 includes the subject matter of Example 17, wherein the one or more operations further comprise: continuously or periodically checking on current usage of the buffers, wherein checking includes calling on the one or more tasks performance components to accurately determine the current usage of the buffers as performed by the one or more tasks performance components; and continuously or periodically check on expected usage of the buffers by the one or more tasks performance components.

Example 22 includes the subject matter of Example 21, wherein the one or more operations further comprise: distinguishing between the first one or more of the buffers and the second one or more of the buffers based on at least one of the current usage or the expected usage of the buffers.

Example 23 includes the subject matter of Example 17, wherein the first portion of the memory is made available to be used by one or more of the other tasks requested by the software application or other software applications.

Example 24 includes the subject matter of Example 17, wherein the one or more operations further comprise: facilitating the performance of the task using the second one or more of the buffers, wherein the performance of the task leads to completion of the task.

Some embodiments pertain to Example 25 includes an apparatus comprising: means for detecting a software application at a computing device, wherein the software application to place a request for a task capable of being executed by a processor of the computing device; means for allocating a composition of buffers and facilitate allocation of physical memory to the buffers to be used to perform the task, wherein a first portion of the physical memory and a second portion of the physical memory are allocated to first one or more of the buffers and second one or more of the buffers, respectively; and means for purging first one or more of the buffers, if the first one or more of the buffers are determined to be unused for the task, wherein purging includes disallowing commitment of the first portion of the physical memory to the first one or more of the buffers such that the first portion of the physical memory remains available for other tasks despite being allocated to the first one or more of the buffers.

Example 26 includes the subject matter of Example 25, further comprising: means for realizing the second one or more of the buffers, if the second one or more of the buffers are determined to be used for the task, wherein realizing includes allowing commitment of the second portion of the physical memory to the second one or more of the buffers in accordance with the allocation of the second portion of the physical memory to the second one or more of the buffers.

Example 27 includes the subject matter of Example 25, further comprising: means for facilitating an allocation component to prepare the composition of buffers based on one or more characteristics of the task or one or more task performance components of the computing device, wherein the one or more tasks performance components include the processor, wherein the processor includes at least one of a graphics processor, an application processor, a media processor, or a set of compute cores; and means for facilitating one or more allocation drivers to allocate the memory to the buffers, wherein the one or more allocation drivers include at least one of a memory allocation driver, a display driver, or a graphics driver.

Example 28 includes the subject matter of Example 27, further comprising: means for facilitating the one or more allocation drivers to: uncommit the first portion of the physical memory associated with the first one or more of the buffers; and commit the second portion of the physical memory associated with the second one or more of the buffers.

Example 29 includes the subject matter of Example 25, further comprising: means for continuously or periodically checking on current usage of the buffers, wherein checking includes calling on the one or more tasks performance components to accurately determine the current usage of the buffers as performed by the one or more tasks performance components; and means for continuously or periodically check on expected usage of the buffers by the one or more tasks performance components.

Example 30 includes the subject matter of Example 29, further comprising: means for distinguishing between the first one or more of the buffers and the second one or more of the buffers based on at least one of the current usage or the expected usage of the buffers.

Example 31 includes the subject matter of Example 25, wherein the first portion of the memory is made available to be used by one or more of the other tasks requested by the software application or other software applications.

Example 32 includes the subject matter of Example 25, further comprising: means for facilitating the performance of the task using the second one or more of the buffers, wherein the performance of the task leads to completion of the task.

Example 33 includes at least one non-transitory or tangible machine-readable medium comprising a plurality of instructions, when executed on a computing device, to implement or perform a method as claimed in any of claims or examples 9-16.

Example 34 includes at least one machine-readable medium comprising a plurality of instructions, when executed on a computing device, to implement or perform a method as claimed in any of claims or examples 9-16.

Example 35 includes a system comprising a mechanism to implement or perform a method as claimed in any of claims or examples 9-16.

Example 36 includes an apparatus comprising means for performing a method as claimed in any of claims or examples 9-16.

Example 37 includes a computing device arranged to implement or perform a method as claimed in any of claims or examples 9-16.

Example 38 includes a communications device arranged to implement or perform a method as claimed in any of claims or examples 9-16.

Example 39 includes at least one machine-readable medium comprising a plurality of instructions, when executed on a computing device, to implement or perform a method or realize an apparatus as claimed in any preceding claims.

Example 40 includes at least one non-transitory or tangible machine-readable medium comprising a plurality of instructions, when executed on a computing device, to implement or perform a method or realize an apparatus as claimed in any preceding claims.

Example 41 includes a system comprising a mechanism to implement or perform a method or realize an apparatus as claimed in any preceding claims.

Example 42 includes an apparatus comprising means to perform a method as claimed in any preceding claims.

Example 43 includes a computing device arranged to implement or perform a method or realize an apparatus as claimed in any preceding claims.

Example 44 includes a communications device arranged to implement or perform a method or realize an apparatus as claimed in any preceding claims.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
    detection/reception logic to detect a software application at a computing device, wherein the software application is to place a request for a task capable of being executed by a processor of the computing device;
    buffer composition and memory allocation logic ("buffer memory logic") to allocate a composition of buffers and facilitate allocation of physical memory to the buffers to be used to perform the task, wherein a first portion of the physical memory and a second portion of the physical memory are allocated to first one or more of the buffers and second one or more of the buffers, respectively; and
    realization/purging logic, implemented at least in part in hardware, to purge first one or more of the buffers, if the first one or more of the buffers are determined to be unused for the task, wherein purging includes disallowing commitment of the first portion of the physical memory to the first one or more of the buffers such that the first portion of the physical memory remains available for other tasks despite being allocated to the first one or more of the buffers.

2. The apparatus of claim 1, wherein the realization/purging logic is further to realize the second one or more of the buffers, if the second one or more of the buffers are determined to be used for the task, wherein realizing includes allowing commitment of the second portion of the physical memory to the second one or more of the buffers in accordance with the allocation of the second portion of the physical memory to the second one or more of the buffers.

3. The apparatus of claim 1,
    wherein the buffer memory logic to facilitate an allocation component to prepare the composition of buffers based on one or more characteristics of the task or one or more task performance components of the computing device,
    wherein the one or more tasks performance components include the processor, wherein the processor includes at least one of a graphics processor, an application processor, a media processor, or a set of compute cores,
    wherein the buffer memory logic is further to facilitate one or more allocation drivers to allocate the physical memory to the buffers, wherein the one or more allocation drivers include at least one of a memory allocation driver, a display driver, or a graphics driver.

4. The apparatus of claim 3, wherein the buffer memory logic is further to facilitate the one or more allocation drivers to:
    uncommit the first portion of the physical memory associated with the first one or more of the buffers; and
    commit the second portion of the physical memory associated with the second one or more of the buffers.

5. The apparatus of claim 1, further comprising: a usage checking logic to continuously or periodically check on current usage of the buffers, wherein checking includes calling on the one or more tasks performance components to accurately determine the current usage of the buffers as performed by the one or more tasks performance components, wherein the usage checking logic is further to continuously or periodically check on expected usage of the buffers by the one or more tasks performance components.

6. The apparatus of claim 5, further comprising: decision logic to distinguish between the first one or more of the buffers and the second one or more of the buffers based on at least one of the current usage or the expected usage of the buffers.

7. The apparatus of claim 1, wherein the first portion of the physical memory is made available to be used by one or more of the other tasks requested by the software application or other software applications.

8. The apparatus of claim 1, further comprising: application/processing logic to facilitate the performance of the task using the second one or more of the buffers, wherein the performance of the task leads to completion of the task.

9. A method comprising:
    detecting a software application at a computing device, wherein the software application is to place a request for a task capable of being executed by a processor of the computing device;
    allocating a composition of buffers and facilitate allocation of physical memory to the buffers to be used to perform the task, wherein a first portion of the physical memory and a second portion of the physical memory are allocated to first one or more of the buffers and second one or more of the buffers, respectively; and purging first one or more of the buffers, if the first one or more of the buffers are determined to be unused for the task, wherein purging includes disallowing commitment of the first portion of the physical memory to the first one or more of the buffers such that the first portion of the physical memory remains available for other tasks despite being allocated to the first one or more of the buffers.

10. The method of claim 9, further comprising: realizing the second one or more of the buffers, if the second one or more of the buffers are determined to be used for the task, wherein realizing includes allowing commitment of the second portion of the physical memory to the second one or more of the buffers in accordance with the allocation of the second portion of the physical memory to the second one or more of the buffers.

11. The method of claim 9, further comprising:
facilitating an allocation component to prepare the composition of buffers based on one or more characteristics of the task or one or more task performance components of the computing device, wherein the one or more tasks performance components include the processor, wherein the processor includes at least one of a graphics processor, an application processor, a media processor, or a set of compute cores; and
facilitating one or more allocation drivers to allocate the physical memory to the buffers, wherein the one or more allocation drivers include at least one of a memory allocation driver, a display driver, or a graphics driver.

12. The method of claim 11, further comprising: facilitating the one or more allocation drivers to:
uncommit the first portion of the physical memory associated with the first one or more of the buffers; and
commit the second portion of the physical memory associated with the second one or more of the buffers.

13. The method of claim 9, further comprising:
continuously or periodically checking on current usage of the buffers, wherein checking includes calling on the one or more tasks performance components to accurately determine the current usage of the buffers as performed by the one or more tasks performance components; and
continuously or periodically check on expected usage of the buffers by the one or more tasks performance components.

14. The method of claim 13, further comprising: distinguishing between the first one or more of the buffers and the second one or more of the buffers based on at least one of the current usage or the expected usage of the buffers.

15. The method of claim 9, wherein the first portion of the physical memory is made available to be used by one or more of the other tasks requested by the software application or other software applications.

16. The method of claim 9, further comprising: facilitating the performance of the task using the second one or more of the buffers, wherein the performance of the task leads to completion of the task.

17. At least one non-transitory machine-readable storage medium comprising a plurality of instructions, executed on a computing device, to facilitate the computing device to perform operations comprising:
detecting a software application at a computing device, wherein the software application is to place a request for a task capable of being executed by a processor of the computing device;
allocating a composition of buffers and facilitate allocation of physical memory to the buffers to be used to perform the task, wherein a first portion of the physical memory and a second portion of the physical memory are allocated to first one or more of the buffers and second one or more of the buffers, respectively;
purging first one or more of the buffers, if the first one or more of the buffers are determined to be unused for the task, wherein purging includes disallowing commitment of the first portion of the physical memory to the first one or more of the buffers such that the first portion of the physical memory remains available for other tasks despite being allocated to the first one or more of the buffers.

18. The machine-readable storage medium of claim 17, wherein the operations further comprise:
realizing the second one or more of the buffers, if the second one or more of the buffers are determined to be used for the task,
wherein realizing includes allowing commitment of the second portion of the physical memory to the second one or more of the buffers in accordance with the allocation of the second portion of the physical memory to the second one or more of the buffers.

19. The machine-readable storage medium of claim 17, wherein the operations further comprise:
facilitating an allocation component to prepare the composition of buffers based on one or more characteristics of the task or one or more task performance components of the computing device, wherein the one or more tasks performance components include the processor, wherein the processor includes at least one of a graphics processor, an application processor, a media processor, or a set of compute cores; and
facilitating one or more allocation drivers to allocate the physical memory to the buffers, wherein the one or more allocation drivers include at least one of a memory allocation driver, a display driver, or a graphics driver.

20. The machine-readable storage medium of claim 19, wherein the operations further comprise: facilitating the one or more allocation drivers to:
uncommit the first portion of the physical memory associated with the first one or more of the buffers; and
commit the second portion of the physical memory associated with the second one or more of the buffers.

21. The machine-readable storage medium of claim 17, wherein the operations further comprise:
continuously or periodically checking on current usage of the buffers, wherein checking includes calling on the one or more tasks performance components to accurately determine the current usage of the buffers as performed by the one or more tasks performance components; and
continuously or periodically check on expected usage of the buffers by the one or more tasks performance components.

22. The machine-readable storage medium of claim 21, wherein the operations further comprise: distinguishing between the first one or more of the buffers and the second one or more of the buffers based on at least one of the current usage or the expected usage of the buffers.

23. The machine-readable storage medium of claim 17, wherein the first portion of the physical memory is made available to be used by one or more of the other tasks requested by the software application or other software applications.

24. The machine-readable storage medium of claim 17, wherein the operations further comprise: facilitating the performance of the task using the second one or more of the buffers, wherein the performance of the task leads to completion of the task.

\* \* \* \* \*